United States Patent
Sengupta et al.

(10) Patent No.: US 11,467,835 B1
(45) Date of Patent: Oct. 11, 2022

(54) FRAMEWORK INTEGRATION FOR INSTANCE-ATTACHABLE ACCELERATOR

(71) Applicant: Amazon Technologies, Inc., Seattle, WA (US)

(72) Inventors: Sudipta Sengupta, Redmond, WA (US); Poorna Chand Srinivas Perumalla, Seattle, WA (US); Jalaja Kurubarahalli, Milpitas, CA (US); Samuel Oshin, San Jose, CA (US); Cory Pruce, Seattle, WA (US); Jun Wu, Seattle, WA (US); Eftiquar Shaikh, Seattle, WA (US); Pragya Agarwal, Seattle, WA (US); David Thomas, Seattle, WA (US); Karan Kothari, Seattle, WA (US); Daniel Evans, Seattle, WA (US); Umang Wadhwa, Seattle, WA (US); Mark Klunder, Seattle, WA (US); Rahul Sharma, Seattle, WA (US); Zdravko Pantic, Seattle, WA (US); Dominic Rajeev Divakaruni, Seattle, WA (US); Andrea Olgiati, Gilroy, CA (US); Leo Dirac, Seattle, WA (US); Nafea Bshara, Cupertino, CA (US); Bratin Saha, Cupertino, CA (US); Matthew Wood, Seattle, WA (US); Swaminathan Sivasubramanian, Sammamish, WA (US); Rajankumar Singh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/199,129

(22) Filed: Nov. 23, 2018

(51) Int. Cl.
*G06F 3/00* (2006.01)
*G06F 9/30* (2018.01)
*G06F 9/38* (2018.01)

(52) U.S. Cl.
CPC ........ *G06F 9/3005* (2013.01); *G06F 9/30181* (2013.01); *G06F 9/3853* (2013.01); *G06F 9/3877* (2013.01)

(58) Field of Classification Search
CPC ............................ G06F 9/541; G06F 9/30181
(Continued)

(56) References Cited

U.S. PATENT DOCUMENTS

| 7,010,796 B1 * | 3/2006 | Strom ..................... G06F 9/547 719/330 |
| 2006/0095722 A1 * | 5/2006 | Biles ..................... G06F 8/4441 712/34 |

(Continued)

FOREIGN PATENT DOCUMENTS

| EP | 0738965 A2 * | 4/1996 | |
| WO | WO-2015167472 A1 * | 11/2015 | ............. G06F 11/30 |

OTHER PUBLICATIONS

Dipanjan Sengupta, GraphReduce: Processing Large-Scale Graphs on Accelerator-Based Systems. (Year: 2015).*

(Continued)

*Primary Examiner* — Lechi Truong
(74) *Attorney, Agent, or Firm* — Nicholson De Vos Webster & Elliott LLP

(57) ABSTRACT

Techniques for partitioning data flow operations between execution on a compute instance and an attached accelerator instance are described. A set of operations supported by the accelerator is obtained. A set of operations associated with the data flow is obtained. An operation in the set of operations associated with the data flow is identified based on the (Continued)

set of operations supported by the accelerator. The accelerator executes the first operation.

20 Claims, 16 Drawing Sheets

(58) Field of Classification Search
USPC .......................................................... 719/328
See application file for complete search history.

(56) References Cited

U.S. PATENT DOCUMENTS

| | | | | |
|---|---|---|---|---|
| 2010/0268791 | A1* | 10/2010 | Arimilli | G06F 9/542 |
| | | | | 709/217 |
| 2014/0033314 | A1* | 1/2014 | Wibbeler | G06F 21/52 |
| | | | | 726/26 |
| 2014/0164480 | A1* | 6/2014 | Anderson | H04L 67/10 |
| | | | | 709/203 |
| 2015/0007182 | A1* | 1/2015 | Rossbach | G06F 9/4843 |
| | | | | 718/102 |
| 2017/0329623 | A1* | 11/2017 | Dong | G06T 1/20 |
| 2018/0284994 | A1* | 10/2018 | Haller | G06F 12/0292 |
| 2020/0012533 | A1* | 1/2020 | Torudbakken | G06F 9/522 |
| 2020/0174851 | A1* | 6/2020 | Manula | H04L 67/10 |

OTHER PUBLICATIONS

NPL search.*
Guobao Shen, A Software Architecture for High Level Applications. (Year: 2004).*
B. N. Merh, API Manager Implementation and Its Use for Indus Accelerator Control. (Year: 2012).*

* cited by examiner

FRAMEWORK INTEGRATION FOR INSTANCE-ATTACHABLE ACCELERATOR

BACKGROUND

As deep learning becomes more prevalent across a range of applications, customers find it challenging and expensive to run in production. Today, customers use GPUs to improve the performance and efficiency of running interference workloads but find it difficult to do so without overprovisioning capacity, which can be wasteful and expensive. The cost of running deep learning inference makes up a significant portion of the overall application infrastructure, and any inefficiency in running these workloads at scale can be cost prohibitive.

BRIEF DESCRIPTION OF DRAWINGS

Various embodiments in accordance with the present disclosure will be described with reference to the following figures.

DETAILED DESCRIPTION

Figure 1:
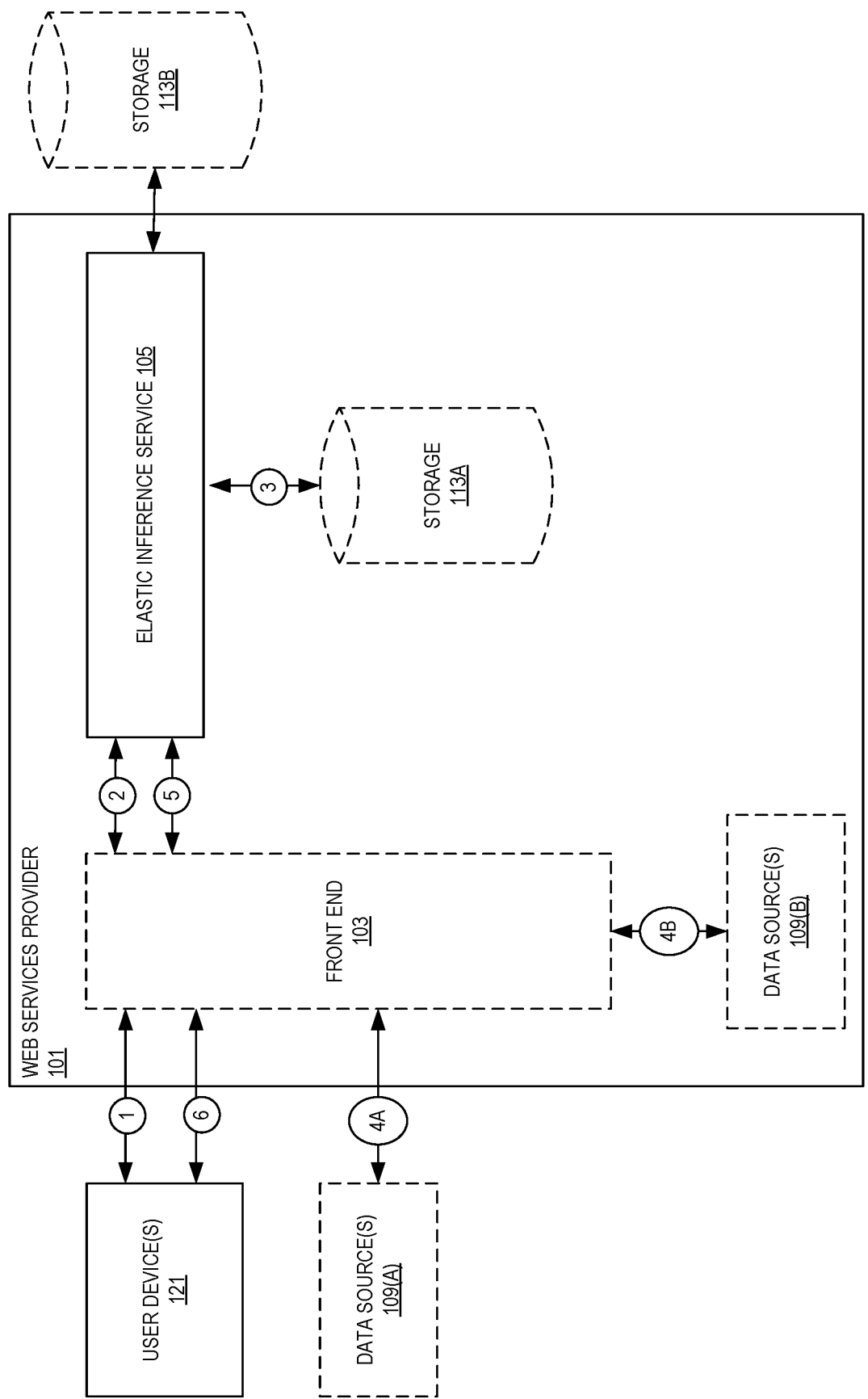
FIG. 1 illustrates embodiments of a system utilizing an elastic inference service.

An elastic machine learning/inference (EI) service provides cost efficient hardware acceleration for applications running on a compute instance. The attachment and use are elastic in that an accelerator can be added or removed and with a plurality of choices of precision and/or speed. As such, developers can incorporate hardware acceleration in more places without using a full accelerator (such as an entire graphics processing unit (GPU)). Further, the EI service obscures the underlying hardware through a hardware-independent interface, allowing the service provider to deploy heterogeneous hardware underneath, depending on cost and capabilities, and adjust to the quickly moving deep learning/artificial intelligence hardware landscape. Further, through an EI interface (the attachment of an accelerator slot and/or commands that allow communication between an accelerator slot and an application), a single accelerator chip can be virtualized across multiple inferencing applications (such as customer instances).

As different machine learning workloads have different amounts of pre- and post-processing requirements outside of the core machine learning (ML) function, and the amount of CPU, DRAM, and hardware acceleration resources needed is not the same for each workload. The decoupling of hardware resources needed for machine learning computation efficiency and acceleration provided by the described EI service allows the developer to size the central processing unit (CPU) and memory (such as dynamic random-access memory (DRAM)) independently in a compute instance.

To enable an application to leverage an attached accelerator when executing a data flow application with few, if any, modifications to the underlying code, embodiments disclosed herein related to a customized application framework and execution environment that dispatches operations to an attached accelerator based on certain criteria such as hardware support and/or performance Existing data flow applications can be executed using accelerator hardware in a manner transparent to both the user and executor that processes the application in some embodiments. Since some operations that may appear in a user's code may not be supported by an accelerator, embodiments in the present disclosure relate to partitioning a user's application such that accelerator-compatible operations are dispatched to an accelerator while other operations are performed by the compute instance. The flexibility to dispatch only certain operations to an accelerator arises from the tension between software and hardware development life cycles. New software operations may be developed at a rapid pace, while hardware acceleration support may require a long development cycle such as two years between the beginning of a design and tape out. Further, accelerators are not replaced or upgraded for an additional several years. As a result, the designer of an accelerator can make best efforts to predict the software operations needed to accelerate future applications but predicting rapidly developing software needs four or more years into the future is a very difficult challenge. As a result, the performance of applications can be greatly improved through acceleration where feasible with little to no intervention by the application developer. Further, although presented in the context of machine learning applications, the techniques for partitioning an application between hardware components for execution may be applicable to other compute applications that can be improved through the use of an accelerator.

FIG. 1 illustrates embodiments of a system utilizing an elastic inference service. In the illustration, the elastic inference service 105 is a service provided by a web services provider 101. The web services provider 101 provides multi-tenant compute and/or storage capabilities.

In some embodiments, a front end 103 of the web services provider 101 is a conduit through which users (such as customers) of the web services provider 101 interact with underlying services of the web services provider 101. For example, a user device 121 interacts with the elastic inference service 105 through the front end 103. This interaction may include the configuration of the elastic inference service 105 and receiving results from the elastic inference service 105. Interaction may be through the use of application programming interface (API) calls and/or a command line interface. In some embodiments, there is a direct coupling to the elastic inference service 105. API calls to DescribeElasticInferenceAccelerators; RunInstances; StartInstances; etc. are utilized in some embodiments.

The elastic inference service 105 manages a pool of accelerator appliances running a specific set of software components to deliver an accelerator. The elastic inference 105 is utilized to execute an application that includes at least some portion of code (such as a model) to be executed on an accelerator. These accelerator appliances reside in a service owned virtual network. Internally, an accelerator maps to an accelerator slot, which comprises a fraction of compute resources from the accelerator appliance. An accelerator appliance may host accelerators comprising a plurality of accelerator slots. The number of accelerators slots being hosted on an accelerator appliance depends on the configuration of the accelerator and the configuration of the accelerator appliance.

Users may launch an application instance and request an accelerator to be attached according to a user provided configuration (examples are detailed herein). A control plane of the elastic inference service 105 handles the request to provision at least one accelerator slot and attach one or more slots to the user's application instance. The configuration may dictate particulars of the accelerator slot(s) to use, or the elastic inference service 105 may do so. After the attachment, the accelerator slot(s) is/are accessible from a user's virtual network or via a more direct connection (such as a PCIe connection).

The elastic inference service 105, as noted above, supports multi-tenancy acceleration for machine learning tasks such as inference. Storage 113A and/or 113B is used to store one or more applications including one or more models to be executed on the elastic inference service 105. Applications may be hosted by the elastic inference service 105 as containers or a run as a part of a virtual machine.

Data source(s) 109A and 109B provide scoring data to be processed by the accelerator run by the elastic inference service 105.

In some embodiments, the elastic inference service 105 is on a user device such as user device 121 and not a part of a web services provider 101 offering, however, in the interest of brevity, most of the discussion below uses a web services provider as the example.

The numbered circles illustrate an exemplary flow. At circle 1, a user device 121 communicates to the web services provider 101 a configuration of the elastic inference service 105. In particular, the user device 121 configures the elastic inference service 105 to host an application from storage 113A that includes a model to run on an accelerator that is controlled by the elastic inference service 105.

At circle 2, this configuration is provided to the elastic inference service 105 which connects to the storage 113A at circle 3 to access and load the model and determine if it can be run on an accelerator of the elastic inference service 105. In some embodiments, the elastic inference service 105 also determines how the accelerator should run the model.

At circles 4A or 4B, a data source 109A or 109B provides scoring data to the front end 103. This scoring data is forwarded to the elastic inference service 105 for processing and a result is provided back to the front end 103 at circle 5. The result may also be stored in storage 113A or 113B. Finally, the result is provided to the user device 121 (if requested).

Figure 2:
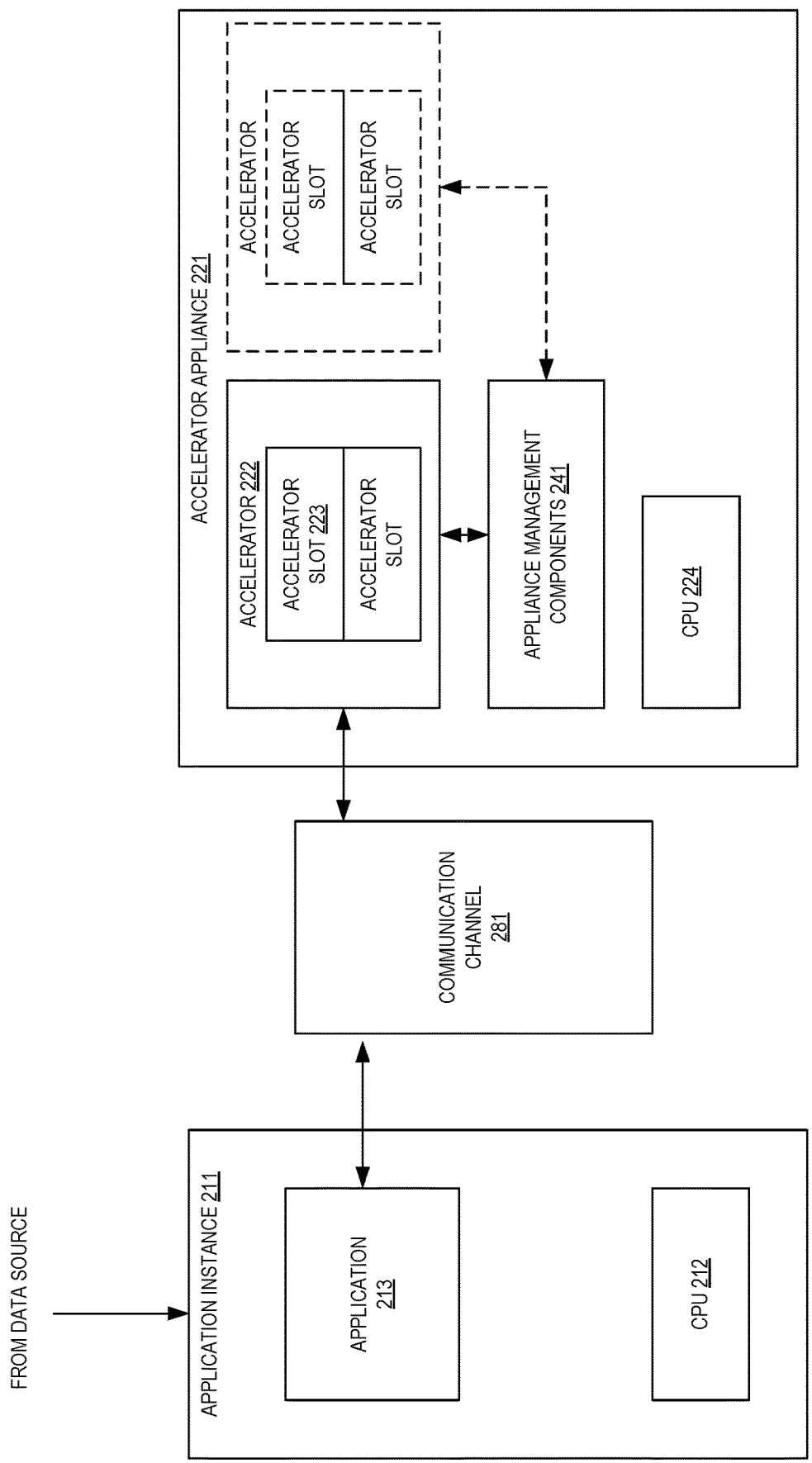
FIG. 2 illustrates embodiments of an elastic inference service.

FIG. 2 illustrates embodiments of an elastic inference service 105. This an elastic inference service 105 may be a part of a web services provider offering, or as an engine on a user device (however, in the interest of brevity as noted above, "service" will be used throughout the application). In particular, what is shown could be considered the data plane of the elastic inference service 105. As shown, the data plane comprises a client component (portion of application instance 211) and a server component (accelerator appliance 221). The client component is delivered as client library implementation installed on the application instance 211. The client library forwards inference calls from the application instance 211 to the remotely attached accelerator appliance 221. In some embodiments, the accelerator appliance 221 receives a tensor from the application instance 211 and returns a tensor.

An application instance 211 is a virtual computing environment that uses a particular configuration of CPU 212, memory, storage, and networking capacity that is to execute an application 213. In some embodiments, the configuration is called an instance type. A template for an application instance (including an operating system) is called a machine image. The application 213 may be called "inference application" below to highlight that a part of the application 213 makes inference calls to at least one accelerator slot. However, the application 213 typically includes other code and the inference call is usually one aspect of an application pipeline.

The instance type that is specified by a user determines the hardware of the host computer to be used for the instance within the web services provider 101. Each instance type offers different compute, memory, and storage capabilities and are grouped in instance families based on these capabilities.

Similarly, an accelerator appliance 221 (another compute instance) uses a particular configuration of CPU 224, memory, storage, and networking capacity that is to execute a machine learning model of application 213. The accelerator appliance 221 additionally has access to one or more accelerators 222. Each accelerator 222 is comprised of one or more accelerator slots 223. In particular, the compute resources of the accelerator appliance 221 are partitioned, allocated, resource governed and isolated across accelerator slots 223 for consistent, sustained performance in a multi-tenant environment. Code executing on the CPU 224 orchestrates the on-board accelerators, runs an inference engine runtime, and offloads computation to the accelerators 222. The resources of an accelerator appliance 221 that could come under contention include the CPU 224, memory, accelerator, accelerator memory, communication channel 281 (such as a direct connection like PCIe or a networked connection), disk, and host-to-interconnect (such as PCIe) bandwidth. An accelerator slot 223 handle the application instance's 211 calls.

Resource governance and isolation may reduce/mitigate interference of requests across accelerator slots 223 through static partitioning of resources across accelerator slots 223 using appliance management components 241. Static partitioning is typically used for the following resource types on an accelerator appliance 221 of CPU cores and memory, accelerator compute and memory, and network bandwidth (at least ingress). However, in some embodiments, dynamic partitioning is utilized such that non-attached slots 223 do not have resources such as memory allocated.

In some embodiments, the CPU 224 resources and disk may be isolated and governed using control groups (cgroups), accelerator resources may be isolated and governed using multi-process service functionality, and network bandwidth may be isolated and governed (such as throttled) using one or more network schedulers. For example, in some embodiments, CPU cores are partitioned across processes using a cpuset mechanism in Cgroups. A small set of cores is shared across the manager/maintenance/health check/logging processes (which are either per accelerator or common to the instance). The remaining portion of the cores are partitioned across the accelerator slots.

For accelerator resources 222, the partitioning of the accelerator slots 223 is dependent on the type of underlying accelerator used. For example, in some embodiments, spatial multiplexing of kernels onto accelerator slots is used. For a given accelerator slot 223, kernels use a fraction of the hardware available. One way to do this is to make the fraction proportional to the Tera operations/sec. (TOPS) capacity of an accelerator slot 223. For a systolic array-based accelerator temporal multiplexing is used to slot a single tensor processing block, with support for pre-empting long running kernels.

A remotely attached accelerator slot 223 is presented to a user as an elastic inference accelerator, an ephemeral device that is attached to the customers application instance 211 on instance launch to provide inference accelerator capabilities to the instance. Users may associate one or more elastic inference accelerators with an application instance.

For communication channel 281 bandwidth usage, a concern is with ingress bandwidth as large tensors may be sent as input for inference calls (e.g., vision models). Each of n ingress branches should use roughly 1/n of the instance bandwidth (even when all n branch network interfaces are not active). Network schedulers (not shown) on accelerator appliance 221 may be used. Communication between an application instance 211 and an accelerator 221 happens on multiple network connections with each connection being initiated by an application instance 211.

The compute capacity of EI for inference can be scaled up and down in different ways. First, the customer instance and EI attachment can be the auto-scaling unit, as EI attachment is part of launch instance template. Second, the customer can attach multiple EI interfaces, of different precision and TOPS, to a given instance and distribute inference calls across them.

For many networks, inference can be performed using 8-bit integer (INT8) computations without significant impact on accuracy. In the real world, input data is often generated with low precision (or, low dynamic range), hence computation at lower precision does not impact the accuracy of the results. Using low-precision computation allows inference to reduce memory usage, transfer data at higher throughput, deploy larger models, and increase OPS throughput via wide vector instructions. However, training often uses higher precision arithmetic (e.g., FP32) to produce a model that uses high-precision weights. Hence, we need to deal with this gap in precision between the trained model (e.g., FP32) and the capabilities/mode of operation of hardware for inference (e.g., INT8).

In some embodiments, the precision capability of the hardware is exposed to the user and the user is to provide the model in the respective precision. In other embodiments, a conversion from higher precision trained model (FP32) to lower precision inference model is performed. To carry out the quantization in an efficient manner using pre-computed min/max bounds for input tensor/activation/weights, a calibration dataset from the user for that model may be used.

The elastic inference service offers at least two arithmetic precisions of FP32 and FP16. In both cases, in some embodiments, a trained model is provided in FP32 format. Running inference in FP16 mode for FP32 model involves simple type conversion (not quantization).

Figure 3:
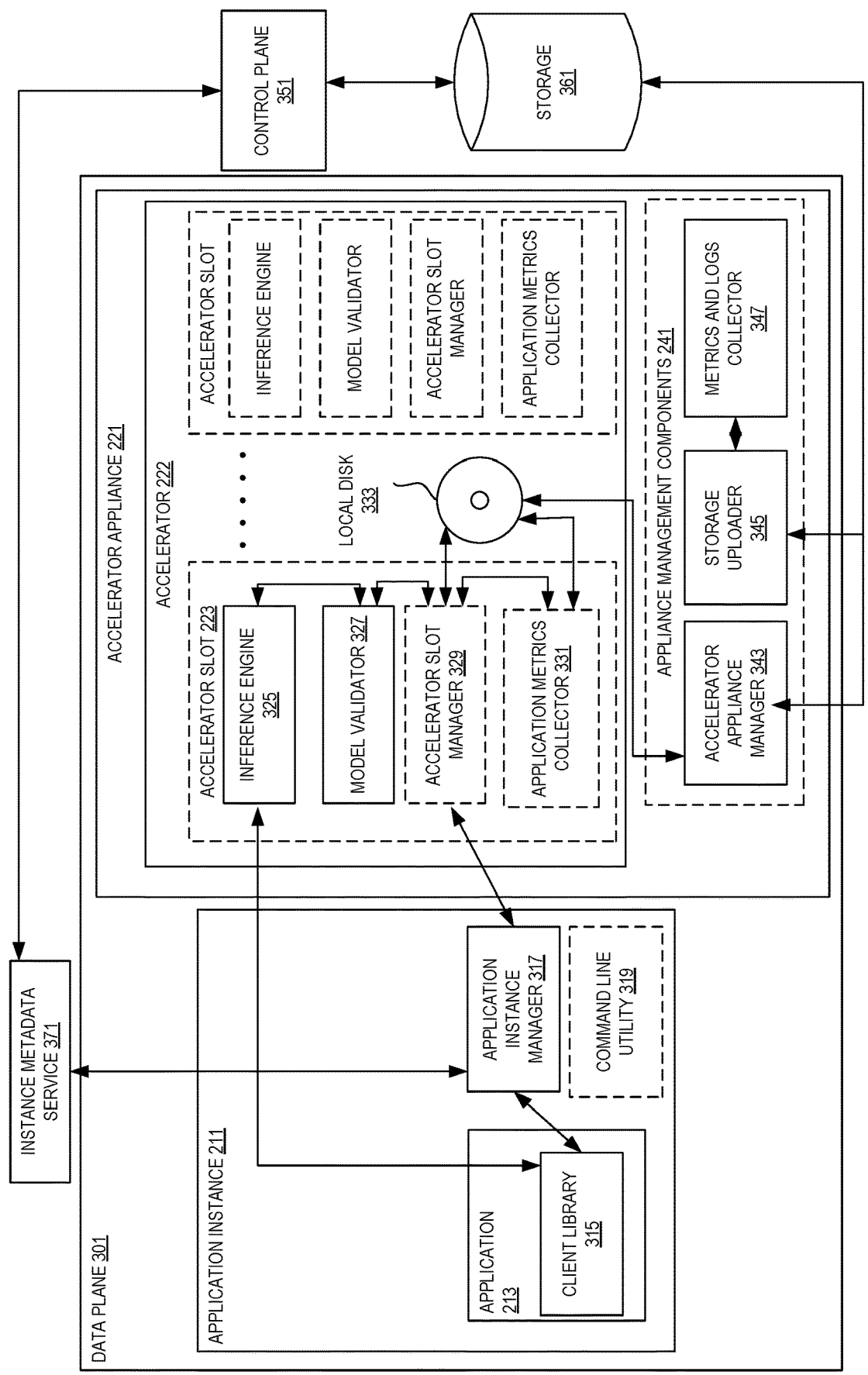
FIG. 3 illustrates embodiments of a system that allows for elastic inference including data plane aspects and control plane aspects.

FIG. 3 illustrates embodiments of a system that allows for elastic inference including data plane aspects and control plane aspects. In some embodiments, the aspects of this system are a part of an elastic inference service. As noted above, a remotely attached accelerator 223 is presented as an elastic inference accelerator (EIA) (or simply accelerator) attached to the user's compute instance. The user's compute instance is labeled as an application instance (AI) 211 and the compute instance which hosts the EIA on the service side is labeled accelerator appliance (AA) 221. Each EIA is mapped to an accelerator slot (AS), which is a fraction of an accelerator is and managed by the AA 221.

An AA 221 may host multiple EIAs 223 and supports multi-tenancy (such that it allows attachments from different application instances 211 belonging to different users). Each accelerator slot can only be attached to one application instance at any given time.

The data plane 301 enables users to run Deep Learning inference applications using one or more remotely attached EIAs; monitor health and performance metrics of the inference applications running on the application instance 211; monitor health and performance metrics of the service components running on the accelerator appliance 221; ensure software components installed on the application instance 211 are up-to-date with the one installed on accelerator appliance 221; notify users about the health, connectivity and performance of the attached EIA; and/or ensure that a EIA delivers the promised performance (for example, in terms of TOPS and memory usage).

The data plane 301 includes at least one application instance 211 and at least one accelerator appliance 221. Each application instance 211 includes an application instance manger (AIM) 317 which runs on the application instance 211 that is responsible for vending the connection of the EIA to the application instance 211, checking connectivity with the EIA, ensuring that the software components installed on the application instance 211 are up-to-date with the one installed on the EIA, and pushing application instance 211 specific health information to the EIA.

The AIM 317 is launched at boot time and relaunched in case of crashes or unexpected shutdowns. When the control plane 351 attaches an accelerator 223, it injects into the instance metadata service (IMDS) 371 of the application instance 211 information on how to contact the accelerator 223 (details on this interaction are detailed in other parts of this specification). In some embodiments, the AIM 317 uses the IMDS 371 to check if an accelerator is attached. If no accelerator is attached to the AI 211, the IMDS 371 stays idle, waiting for the attachment of a new accelerator. If an accelerator is attached, the AIM 317 tries to connect to an accelerator slot manager (ASM) 329 in some embodiments. The communication happens through an endpoint served by the ASM 329 and initiated by AIM 317 in some embodiments. If the connection fails or if the connection is dropped in a later moment, after a few retries, the IMDS 371 reports the problem to the end-user. In some embodiments, the IMDS 371 is a http server that customers can use (for example, by curling a known endpoint from within their instance) to introspect certain data about their instance (e.g. in-stance-id, attached network interfaces, etc.).

If the connection is established, then the AIM 317 interacts with the ASM 329 to take inventory of the software that to be installed. The components on the AS are expected to be running an up-to-date software version or a compatible version with the components on the AI 211 at the end of this handshake procedure. In some embodiments, the up-to-date software version is loaded at this time such that the software is compatible with the model to be run. If the machine instance is locked and the components in the AI 211 are not compatible with the components in the accelerator, the connection is dropped and is reported in some embodiments.

The application 213 itself uses a client library 315 to make calls to the inference engine 325 of the accelerator 223. In some embodiments, the client library 315 uses gRPC for the remote procedure calls to the inference engine 325.

In some embodiments, the client library 315 implements an API. This API may include one or more of the following commands:

- EIA.initLibrary (eiaID)—initialize a EIA context for the application which will be used in making calls to the EIA attached to the customer's application instance. An optional argument "eiaID" could be passed in case multiple EIA's are attached to the customer's application instance. Throws exception if the eiaID is invalid or there is no EIA attached.
- eia.loadModel (name, model-config.xml, runtimeParameters)—load a model with the configuration given in "model-config.xml". The framework, version, location and other details related to the model could be passed using "model-config.xml". Runtime parameters such as max batch size could be provided using "modelParameters".
- model.predict (inputTensor)—a synchronous inference API call to the "model" loaded onto the EIA. It returns the output tensor.
- model.predictBatch (inputTensorArray)—a synchronous inference batch API call to the "model" loaded onto the EIA.
- model.predictAsync (iTensor)—an asynchronous inference API call to the "model" loaded onto the EIA. It returns a future using which one can retrieve results.
- outputFuture.getResults( )—return/block to retrieve the results of the inference call issued earlier.
- model.predictBatchAsync (iTensorArray)—an asynchronous inference batch API call to the "model" loaded onto the EIA. It returns a future using which one can retrieve results.
- eia.listModels( )—list the models loaded onto the EIA "eia."
- eia.unloadModel (name)—unload the model "name" which was loaded earlier. Exception is thrown if the model is not present.
- eia.createTensor (shape, dtype)—create/allocate the tensor on EIA context with the specified shape and type.
- eia.copyTensor (source, target)—copy the tensor from the "source" to the "target."
- deleteTensor (inputTensor)—delete/de-allocate the tensor that was created earlier on the EIA context.

In some embodiments, a command line utility 319 may be used to access connectivity information and/or generate commands for inference, etc.

The AA 221 comprises several components including accelerator slot(s) 223, disk 333, and appliance management components 241. AA 221 components are responsible for bootstrapping, provisioning of isolated accelerator slots, monitoring events from the control plane 351 (such as attachment/recycling of accelerator slots), updating slots and appliance status (such as health and network connectivity) to the control plane 351, uploading metrics/logs.

The control plane 351 comprises a number of service components that perform the integration with the application instance 211 launch and termination and support for device query and management. As such, via the control plane Q51, users may launch an application instance 211 requesting that one on more accelerator slots 223 be attached as an elastic accelerator to the application instance 211, and terminate an application instance 211 that has an elastic inference accelerator attached to it.

In some embodiments, maintenance notifications for application instance 211 for when the accelerator appliance GQ21 backing the associated elastic inference accelerator becomes impaired or requires maintenance are routed through the control plane 351 to the user. Further, in some embodiments, the control plane 351 provides the metrics of the accelerator appliance 221 and application instance 211 to a user.

As noted above, accelerator slot 223 components run on every accelerator slot. All the components in an accelerator slot are isolated in terms of resources such as CPU, RAM, GPU compute, GPU memory, disk, and network. Accelerator slot components serve the attached customer instance for that accelerator slot 223.

An accelerator slot manager (ASM) 329 is responsible for the installation of the software components on the application instance 211. The ASM 329 listens a handshake, software synchronization, and health checks from the application instance 211. AIM 317 connects to the ASM 329 with the software inventory that is present in the application instance 211.

The ASM 329 is also responsible for receiving periodic health checks from the AIM 317. The ASM 329 reports the connectivity of the application instance 211 based on the receipt of the health check message from the AIM 317. This is written to disk by ASM 329 and read and reported to the control plane by the AAM through storage 361. The AIM 317 tracks the connectivity information. This could be retrieved by the customer on the application instance 211 using the utilities provided by the client library 315 or the command line utilities 319.

An inference engine (IE) 325 handles model loading and inference execution. As shown, this engine 325 is a separate process per accelerator slot 223. The IE 325 receives requests from the client library 315 on customer instance via a front-end receiver library. The IE 325 encompasses the run-times needed for the inference to work.

A model validator (MV) 327 checks user provided model file syntax for correctness and validity. In some embodiments, this is done in as a CPU process that is separate from the inference engine 223 so that there is no security-related leakage to the accelerator runtime. In some embodiments, the MV 327 converts the provided model to a different format (such as serializing MXNET to JSON). In some embodiments, the MV 327 selects the inference engine 325 to use when the application 213 (including library 315) has not made a selection.

In some embodiments, an application metrics collector 331 is a set of tools used to send, collect, and aggregate metrics for the application. In some embodiments, the application metrics collector 331 is StatsD. Metrics that are collected are stored to local disk 333 which is accessible by the appliance management components 241.

The appliance management components 241 include an accelerator appliance manager (AAM) 343, a storage uploader 345, and a metrics and log collector 347. The AAM 343 bootstraps the accelerator appliance 221 and provisions accelerator slots 221 via the monitoring of stored objects of storage 361, de-provisions/de-attaches accelerator slots once they are no longer needed, and recycles the accelerator slot for future use. It also monitors the accelerator slots 223 for their health and occupancy, and prepares an object to be uploaded to storage 361 by the storage uploader 345. Note that the monitoring and reporting of accelerators could be segregated and handled by another component.

The metrics and log collector 347 collects metrics and logs from the accelerator slots 223 and accelerator appliance 223 and massages the data appropriately for consumption by the control plane 351.

The storage uploader 345 uploads the health and occupancy reports (prepared by AAM 343), and metrics and log.

The inference applications using the client library 315 get the connection information of the accelerator appliance 221 by communicating with AIM 317.

The AIM 317 pushes to the ASM 329 heartbeats to notify the liveness of the AIM 317. This information is used by the ASM 329 report back to the control plane 351 about the health of the attached application instance 211.

The illustrated system minimizes the number of components between an application 213 using an accelerator running on the application instance 211 and the inference engine 325 running on the accelerator slot 223 to minimize latency and failure rate. Further, the control plane 351 of the inference service is decoupled from the data plane 301 (as shown) such that an outage in the control plane 351 should not impact application instances 211 or the accelerator slots 223 they are using.

The EI interface (the interface to the EIA) can be attached to an application instance during instance launch or dynamically attached/detached (to/from) a live instance. The EI interface can be accessed directly using the client library 315 or via model frameworks (such TensorFlow and MXNet frameworks). In a typical use case, an application instance 211 runs a larger machine learning pipeline, out of which only the accelerator appliance 221 bound calls will be sent using the EI interface API and the rest executed locally. Pre-processing of data input and post-processing of inferencing output is also done on the application instance 211. An example of an API command for launching an instance with an accelerator is as follows:

S aws ec2 run-instances--region us-east-1--eia-specification type=fp16.eia.medium--instance-type t2.medium--image-id ami-e3bb7399

The EI interface is sized by specifying arithmetic precision (such as FP32, FP16, INT8, etc.) and computational capacity (TOPS). An EI interface API allows for loading models, making inference calls against them (such as tensor in/tensor out), and unloading models. Multiple models can be loaded via an EI interface at any given time. A model consists of (i) a description of the whole computation graph for inference, and (ii) weights obtained from training. An example of an API command for loading is as follows:

S eia load-model--model-location "s3 location"--role "eiaRole"--model_name "my_model_1"--max_batch_size 16

Models come in many different formats and embodiments of the service described herein support multiple formats. In some embodiments, model formats exported from TensorFlow and MXNet frameworks and model exchange formats like ONNX are supported. How a particular format is treated may vary. Typically, a model is loaded into an application instance and accelerator via one or more files and/or objects. For example, a model may be loaded into storage (such as storage 361) and then made available to the application instance and accelerator. These files and/or objects specify the model as a weighted computational graph such as in the format of TensorFlow, Apache MXNet, or ONNX. The model definition will use built-in operators/layers defined in the respective framework or interchange format. The model format version is specified in the model file and is the version number of the respective framework that was used to export the file (e.g., TensorFlow 1.5, MXNet 1.0, ONNX 1.0). In some embodiments, the accelerator runtime (such as model validator 327) will use this information to determine which inference engine 325 to use to serve the model.

During EI interface initialization, the trained model (computation graph) is provided as input and profiled, and, subsequently, the application 213 makes inferencing calls via the client library 315 on the application instance 211. There are many ways to implement this approach.

In some embodiments, ahead-of-time (AOT) compilation is used. For example, during the model loading on the EI interface, the trained model is compiled into target (hardware) code. This involves two sub-steps. First, a frontend compiler converts from the trained model file format to an intermediate representation while incorporating target-independent optimizations and analyses. Second, a backend compiler converts from the intermediate representation to machine code with target-dependent optimizations and analyses. This "AOT" compilation allows for whole program analysis. The target hardware is a combination of a CPU and accelerator device on the accelerator appliance 221 with the compilation is done on the accelerator appliance 221. The output incorporates an optimized execution plan for inference that is specific to the target architecture. The compile phase may need additional input like maximum batch size. Additionally, the representation can also be serialized to storage if needed, so that the compile phase can be avoided for future instantiations of inference for the same model and accelerator appliance 221 hardware. The runtime on the accelerator appliance 221 instantiates this as an "inference runtime object" in memory and uses it to execute future inferencing calls on the EI interface. The AOT compilation approach removes (most of the) machine learning (ML) engine dependency, hence the runtime has a low memory footprint and lower CPU overhead. In many cases, it may also lead to higher inferencing performance.

In some embodiments, a ML engine on the accelerator appliance 221 is utilized. The ML engine takes in the model as input and executes it during inferencing. Because the ML engine traverses the model graph and calls operator level API, this will have higher memory footprint and CPU overhead on the accelerator appliance 221.

In some embodiment, a ML engine on the application instance 211 is utilized. For some GPU-based acceleration, the CPU splits the computation between itself and the GPU and makes calls to the interface to offload computation to the GPU. This allows an ML engine to run on the customer instance and make calls over the network to the accelerator appliance 221 at the granularity of computation primitives. It is also possible to reduce latency of this approach by aggregating remote calls and sending them in a batch to the accelerator appliance 221. The client library 315 will be used to load the model on accelerator appliance 221 underneath the framework and subsequently to make inference calls to it.

In some embodiments, the advertised TOPS is attributable to the compute capacity of the acceleration hardware and not the CPU of that would run the application instance 211. Most compute-intensive operators have will be executed on the accelerator (for example, MXNet has a GPU implementation), but in control flow operators may not be expressible in serialized model format and will run on the CPU. Each accelerator slot on the accelerator appliance 221 also gets a share of the CPU of the application instance 211 and that share is proportional to provisioned TOPS.

In some embodiments, the syntax of the model is validated for correctness and conformity to the respective framework/version so that the customer cannot use this form as input to exploit vulnerabilities in the inference engines 223. The model validator verifies model syntax for each framework/format. This validation is done as a process that is separate from the inference engine 223 so that there is no security-related leakage to GPU runtime.

Figure 4:
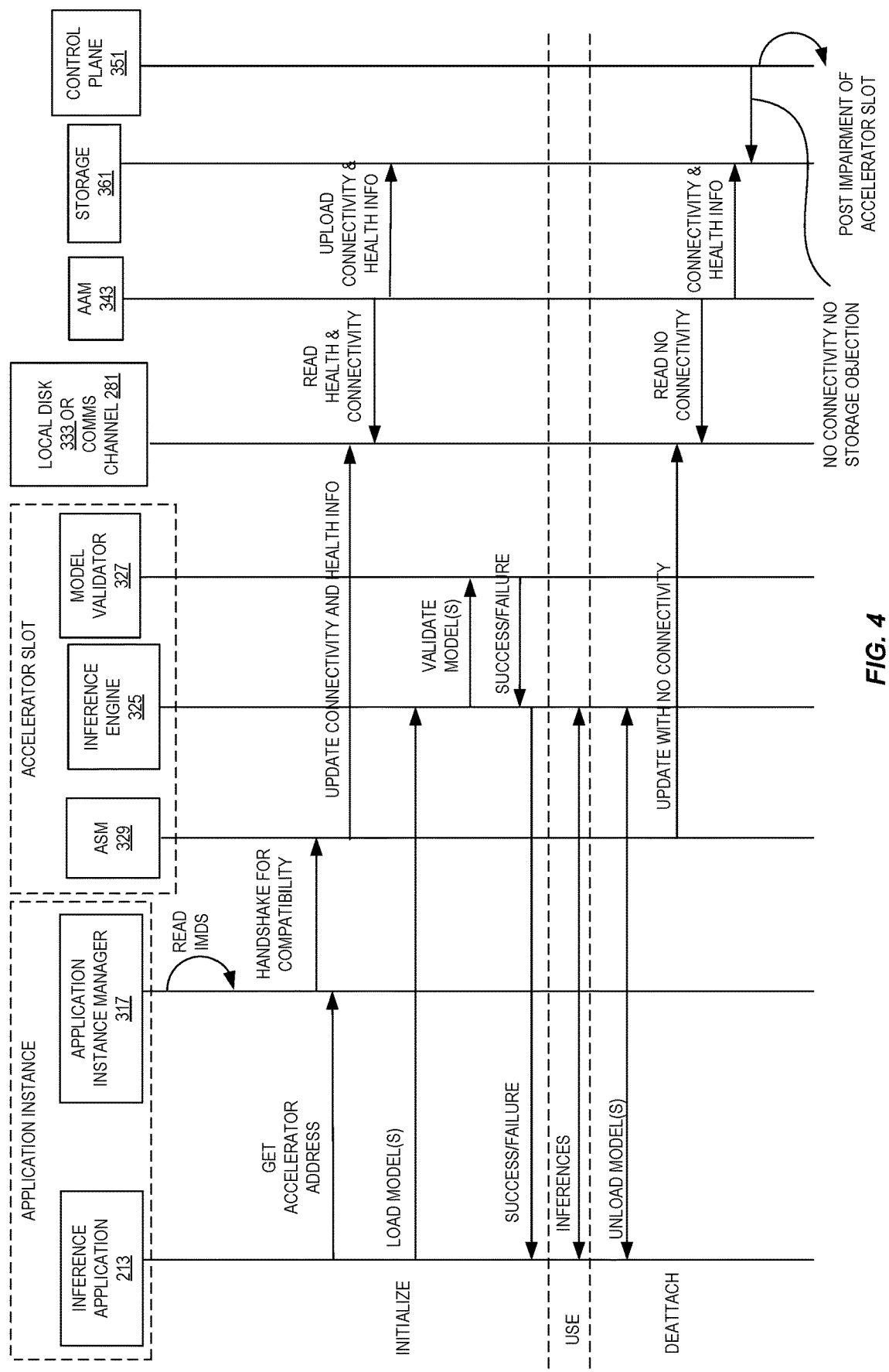
FIG. 4 illustrates embodiments of a swim diagram of a method of using an accelerator for elastic inference including interactions between an application instance and an accelerator appliance.

FIG. 4 illustrates embodiments of a swim diagram of a method of using an accelerator for elastic inference including interactions between an application instance and an accelerator appliance.

As shown, the AIM 317 reads the IMDS to get information on how to contact the accelerator 222. In some embodiments, the IMDS information includes information on how to contact a particular accelerator slot 223.

The AIM 317 and ASM 329 of the accelerator slot 223 perform a handshake operation to determine compatibility. If compatible, the inference application 213 of the application instance 211 acquires the address of the accelerator from the AIM 317. As such, the inference application 213 now knows where to address scoring data it is to process.

The ASM 329 of the accelerator slot to be used by the application instance updates its connectivity and health information in a local disk 333 of the accelerator appliance or using a communication channel 281. The AAM 343 reads this information and places it into storage 361 accessible by the control plane. As such, the application instance and accelerator slot have learned how to connect to each other, and the accelerator appliance has made that information available to the control plane 351. How the control plane interacts with that data is detailed elsewhere.

The inference application 213 also loads one or more models that it wants to use to the accelerator slot. In some embodiments, this load is to an inference engine 325 which then calls the model validator 327 to validate any uploaded model(s). The success or failure of that validation is provided to the inference engine. In other embodiments, the load from the inference engine 212 is to the model validator 327 which validates the model, chooses an inference engine 325 to utilize, and provides the validated model to the chosen inference engine 325. An indication of successful model loading is provided to the inference application 213.

As scoring data is received by the inference application 213 is directed to the inference engine 325 and the result(s) are passed back.

When the model is not longer to be used, it is unloaded via a command from the inference application 213 to the accelerator slot. In particular, the inference engine 325 is no longer provisioned to handle requests from the inference application 213.

Note, as discussed elsewhere, the accelerator slot (ASM 329 in particular) updates the local disk 333 with connectivity information which the AAM 343 provides to storage 361 for consumption, or sends over a communication channel 281. When the control plane 351 determines there is no connectivity (such as after unload of the model or failure) via the storage 361, it makes the slot as being impaired.

Additionally, failures when using one or more accelerator slots can happen because of connectivity issues, component failures, component incompatibilities, etc. Detecting the failure, identifying the root cause, and notifying the user to take necessary and corrective action are functions the elastic inference service 105 provides in some embodiments. As noted above, an accelerator slot emits metrics regarding connection health and slot health which are then uploaded by the AAM 343 to storage 361 for consumption by the control plane 351. Connection health could be in one of these states: connected and not connected. Connected indicates that the application instance 211 is able to reach the accelerator slot 223 via "application level ping" and the application instance 211 components are compatible with the components on the accelerator slot 223. Not connected could mean either the application instance 211 couldn't reach the ASM 329 or the components are incompatible.

Accelerator health identifies whether the accelerator is healthy. Accelerator health could be in one of these many states including, but not limited to: healthy or unhealthy. The healthiness of the accelerator slot 223 depends on a variety of factors including whether the inference engine 325 is able to respond to inference requests. This check is done by ASM 329 by pinging the inference engine 325.

ASM 329 emits these states per accelerator to a local disk 333 which this then read by the AAM 343 and forwarded states to the control plane 351. The control plane 351 consolidates these states to one state for which reflects the state of the attachment as: OK, Impaired and Unknown and made available to the user.

Figure 5:
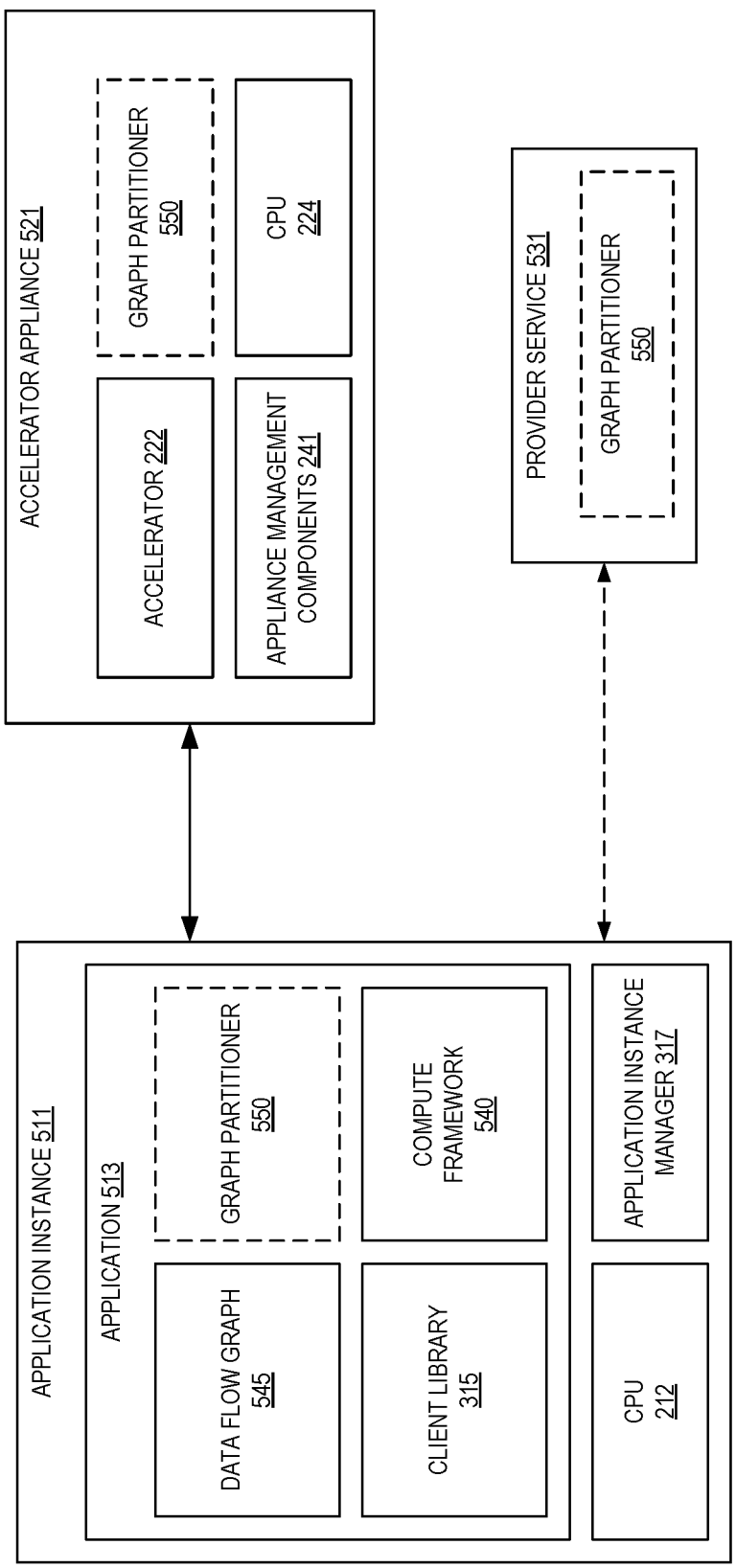
FIG. 5 illustrates embodiments of a system that partitions data flow operations between an application instance and an accelerator appliance.

FIG. 5 illustrates embodiments of a system that partitions data flow operations between an application instance and an accelerator appliance attached to the application instance. As shown, an application instance 511 is in communication with an accelerator appliance 521, such as via a communication channel 281, described above. Like the accelerator appliance 221, the accelerator appliance 521 includes an accelerator 222, appliance management components 241, and CPU 224. In some embodiments, the accelerator appliance 521 includes a graph partitioner 550, as described below. Like application instance 211, the application instance 511 includes a CPU 212, client library 315, and application instance manager 316. In addition to the client library 315, the application 513 includes a compute framework 540, a data flow graph 545, and, in some embodiments, a graph partitioner 550.

The compute framework 540 provides resources for developers to use when developing machine learning or other applications using data flow models. Exemplary machine learning frameworks include Tensorflow, MXNet, PyTorch, TensorRT. Other frameworks may be used for other applications. The compute framework 540 further provide for the execution of data flows in some embodiments.

The data flow graph 545 represents an application developed using a data flow programming paradigm. Examples of data flow graphs are provided in subsequent figures. At a high level, a data flow can be represented by a graph data structure in which nodes represent operations and edges between nodes represent data (e.g., multi-dimensional arrays or tensors) input to and output from operations. Exemplary operations include data input/output operations, metadata calls, convolution, matrix multiplication, vector operators, transcendental functions such as sine, cosine, and tangent, exponential functions, logarithmic functions, deep learning activation functions, and so on. The compute framework 540 provide operators to perform such operations. In some embodiments, a data flow includes information about the operations being performed, the data types and/or dimensions of the data being input to and output from the operations, etc. The data flow graph may be stored in a storage device of a web services provider accessible to the application instance via a communication channel such as communication channel 281.

The graph partitioner 550 is an application that evaluates the data flow graph 545 to identify accelerator-supported operations that can be dispatched to the attached accelerator 222. As shown, a graph partitioner 550 may be implemented locally within the application instance 511, remotely as part of a provider service 531 (e.g., as part of the elastic inference service 105), or remotely as part of the accelerator appliance 521. In the remote cases, the application 513 sends the data flow graph 545 to the graph partitioner 550 for partitioning via a communication channel and the resulting partitioned graph is returned to the application 513. The graph partitioner 550 obtains a list of supported operations by the specific accelerator(s) attached to the application instance 511, since accelerators may support different sets of operations. For example, in embodiments where the graph partitioner 550 is part of the application instance 511, the graph partitioner 550 may obtain the list of compatible operations by querying an API vended by the client library 315 to access the accelerator 222 via the communications channel established by the AIM 317. In some cases, a centralized service or data store, such as IMDS 371, includes the identification of the operations supported by the accelerator(s) available to the application instance 511 and provides the identification to the graph partitioner 550. In some embodiments, multiple accelerators may be attached to an instance, so the graph partitioner 550 obtains an identification of the supported operations by each of the attached accelerators (e.g., since different accelerators may support different sets of operations). In some embodiments, the graph partitioner 550 further obtains performance information related to the performance of the accelerator when performing certain operations (e.g., data throughput, operations per second, etc.).

In some embodiments, the graph partitioner 550 evaluates the feasibility of dispatching operations in a data flow to an attached accelerator. The graph partitioner 550 tags operations which are supported by an attached accelerator for execution by the attached accelerator. In some embodiments, the graph partitioner 550 generates a new data flow post-partitioning that substitutes operation calls which are normally executed on the application instance 511 with operation calls that are executed on the attached accelerator. For example, the compute framework 540 can be loaded with custom operation definitions that send computations to and retrieve results from an attached accelerator via the client library 315.

In some embodiments, the graph partitioner 550 evaluates the performance associated with dispatching operations to an attached accelerator when partitioning a graph to further optimize the runtime performance of the application. Exemplary performance parameters include the transfer rate of data between the application instance 511 and an attached accelerator and the relative performance of executing an operation on the application instance 511 versus on the attached accelerator.

There is a performance cost in transferring input data to the accelerator 222 and output data from the accelerator 222. In some embodiments, the graph partitioner 550 evaluates the amount of data to be transferred relative to the throughput of the communication channel coupling the application instance 511 to the accelerator appliance 521 to determine whether an accelerator-supported operation should be executed by the application instance 511 or an attached accelerator. An accelerator supported operation appearing at the beginning or the end of a graph may result in a single round-trip data transfer. Likewise, a single accelerator supported operation in the middle of a graph may result in a single round-trip data transfer. However, as the number of discontiguous accelerator supported operations in a graph increase, the number of round-trip data transfers between the application instance 511 and attached accelerator(s) increases. Since new hardware accelerators generally improve over time, the network latency associated with data transfers can become a dominant factor in the runtime of data flow applications that involve a large number of data transfers between the application instance and the attached accelerator(s).

In some embodiments, the graph partitioner 550 evaluates the relative performance of performance of executing an operation with the application instance 511 versus an attached accelerator. The performance of an accelerator-supported operation may be characterized with latency and/or throughput profiles associated with the operation on each of the application instance 511 and an attached accelerator. There may be a latency associated with configuration an attached accelerator to perform a certain operation, and the attached accelerator, once-configured, may have throughput, or data processing rate, at which it can perform the operation. Thus, for example, if the round-trip time associated with the data transfer plus the configuration and processing time for the operation (e.g., based on the amount of data to be processed) is greater than the processing time of the operation on the application instance 511, the graph partitioner 550 may avoid substituting or modifying the operation in the data flow graph so that it will be executed by the application instance 511. That is, some operations that are supported by an accelerator not be executed by the accelerator and instead be executed by the application to avoid the overhead associated with the data transfer between the application instance 511 and the attached accelerator.

In some embodiments, a data flow graph may include various control flow operations or statements such as loops, conditions, and the like. In partitioning a data flow including control flow operations, the graph partitioner 550 may partition the graph such that some control flow operations are executed by an attached accelerator. For example, in the case of a loop, the graph partitioner 550 may assign execution of either the loop body or the loop body and control (e.g., loop conditions) to the accelerator. By moving execution of control flow operations to the accelerator, the number of control and/or data transfers between the application instance 511 and the attached accelerator can be reduced to improve the data flow execution performance.

Some operations in a data flow graph may perform manipulations on data objects (e.g., tensors) that are generated by other operations of the graph. In some embodiments, the graph partitioner 550 assigns such manipulation operations to the same device (e.g., either the application instance or the attached accelerator instance) as the operation that created the data object.

After partitioning the graph, the compute framework 540 can execute the partitioned graph by sending the accelerator-compatible operations to the attached accelerator 222, leveraging the client library 315, as described above, and execute the non-compatible (or non-reassigned) operations on the application instance 511. Note that the compute framework 540 is responsible for maintaining the computation dependencies in some embodiments. That is, the compute framework 540 retrieves results from the attached accelerator 222 for dependent operations executed on the application instance 511. Similarly, the compute framework 540 sends results from operations executed on the application instance 511 for dependent operations executed on the accelerator appliance 521.

In some circumstances, all of the operations of a data flow graph may be supported by the attached accelerator. In such cases, upon execution of the graph by the compute framework 540, the compute framework 540 can submit the entire graph to the attached accelerator 222.

Figure 6:
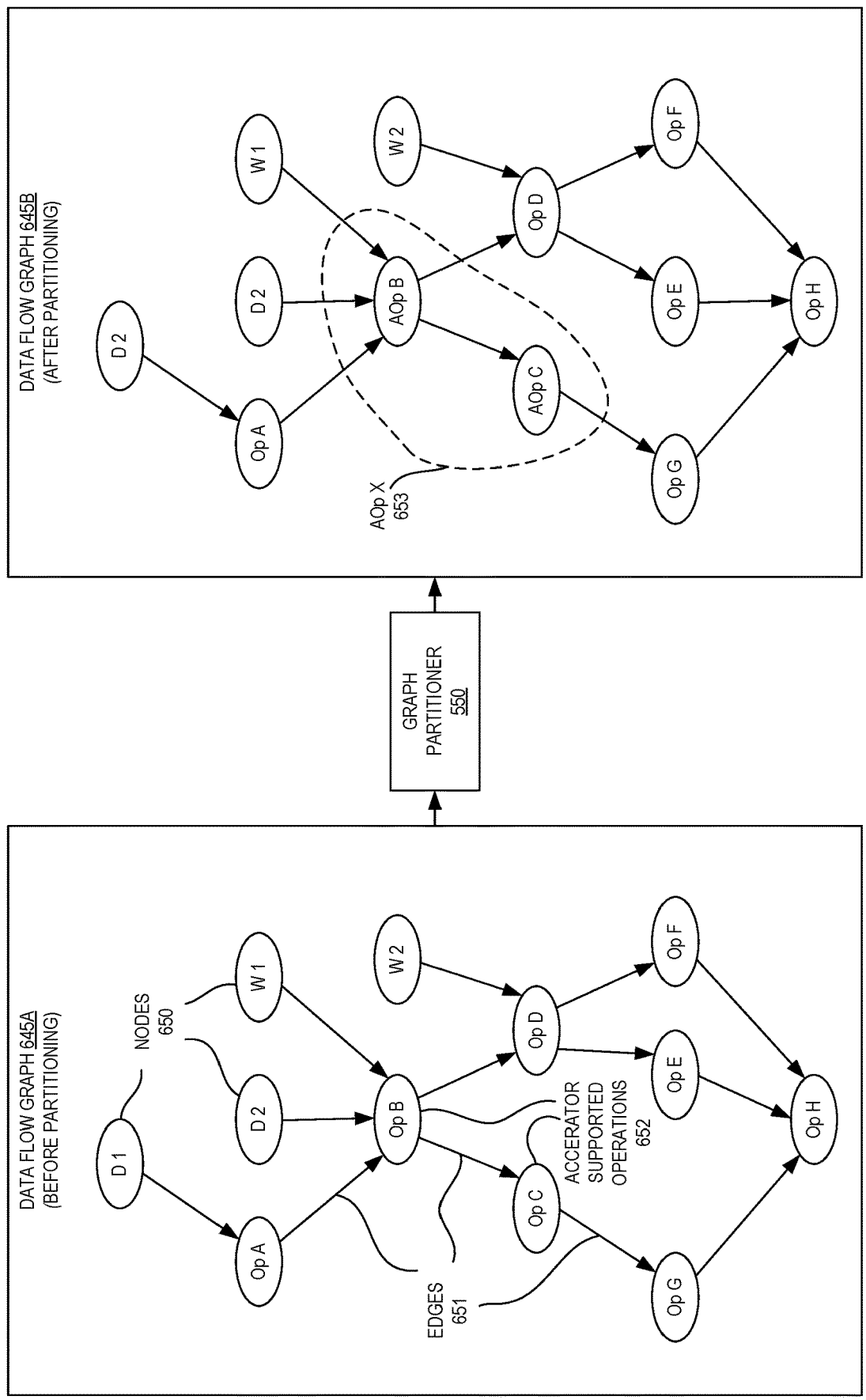
FIG. 6 illustrates embodiments of an exemplary data flow partitioning.

FIG. 6 illustrates embodiments of an exemplary data flow partitioning. On the left side of FIG. 6 is an exemplary data flow graph 645A before partitioning, and on the right side of FIG. 6 is an exemplary data flow graph 645B after partitioning. The circles, or nodes 650, represent operations or input data to operations. For example, nodes "D 1" and "D 2" may be input data in this exemplary data flow, such as an image or audio file, while nodes "W 1" and "W 2" may be weights used for inference operations. Nodes prefixed "Op" represent operations in the data flow. Operation data flow dependencies are shown by edges 651 in the graph, indicating data is passed from one node to the next, such as multidimensional arrays or tensors. In this example, operation ("Op") A depends on "D 1." Operation B depends on the output of Op A, "D 2," and "W 1." Operation C depends on an output of operation B, and operation G depends on an output of operation C. Operation D depends on an output of operation B and "W 2." Operations E and F respectively depend on one or more outputs from operation D. And operation H depends on outputs from operations G, E, and F. In this example, operations B and C are accelerator supported operations 652.

The graph partitioner 550 takes as input the data flow graph 645A and modifies it or creates a new data flow graph. The data flow graph 645B identifies accelerator-compatible operations to the compute framework (not shown) by tagging certain operations for the accelerator execution. In generating data flow graph 645B, the graph partitioner 550 relies on the set of accelerator-supported operations, described above. As shown in data flow graph 645B, the graph partitioner 550 can substitute or replace accelerator-supported operations B and C with special operations to flag the operations for execution by the accelerator (e.g., "AOp"), in some embodiments.

In some embodiments, the graph partitioner 550 can coalesce or encapsulate contiguous or adjacent operations of the data flow graph 645A that are supported by the accelerator into a single subgraph operator ("AOp X") 653. A subgraph operator encapsulates a group of operators that will execute on an attached accelerator. An exemplary subgraph operator includes several attributes, including graph shape, data type, and input/output function(s) to send inputs to the attached accelerator and retrieve results from the accelerator. In some embodiments, the subgraph operator retains characteristics of the encapsulated operations. One such characteristic is the shape of the tensors at the input(s) and output(s) of the coalesced nodes to preserve the dimensions relative to the unpartitioned data flow graph prior. Another characteristic is the data type (e.g., FP16, FP32) as defined in the unpartitioned data flow graph. In some embodiments, each subgraph operator includes a unique identifier to distinguish it from other subgraph operators.

In one embodiment, the graph partitioner 550 generates subgraph operators by identifying unions of operators that are supported by the attached accelerator. With reference to data flow graph 645A, the graph partitioner 550 would identify the union of operations B and C. After identifying unions, the graph partitioner 550 traverses the input data flow graph in reverse order (e.g., from end to beginning) to identify the final operation in each identified union and creates a subgraph operator for the union such as AOp X in data flow graph 645B.

Figure 7:
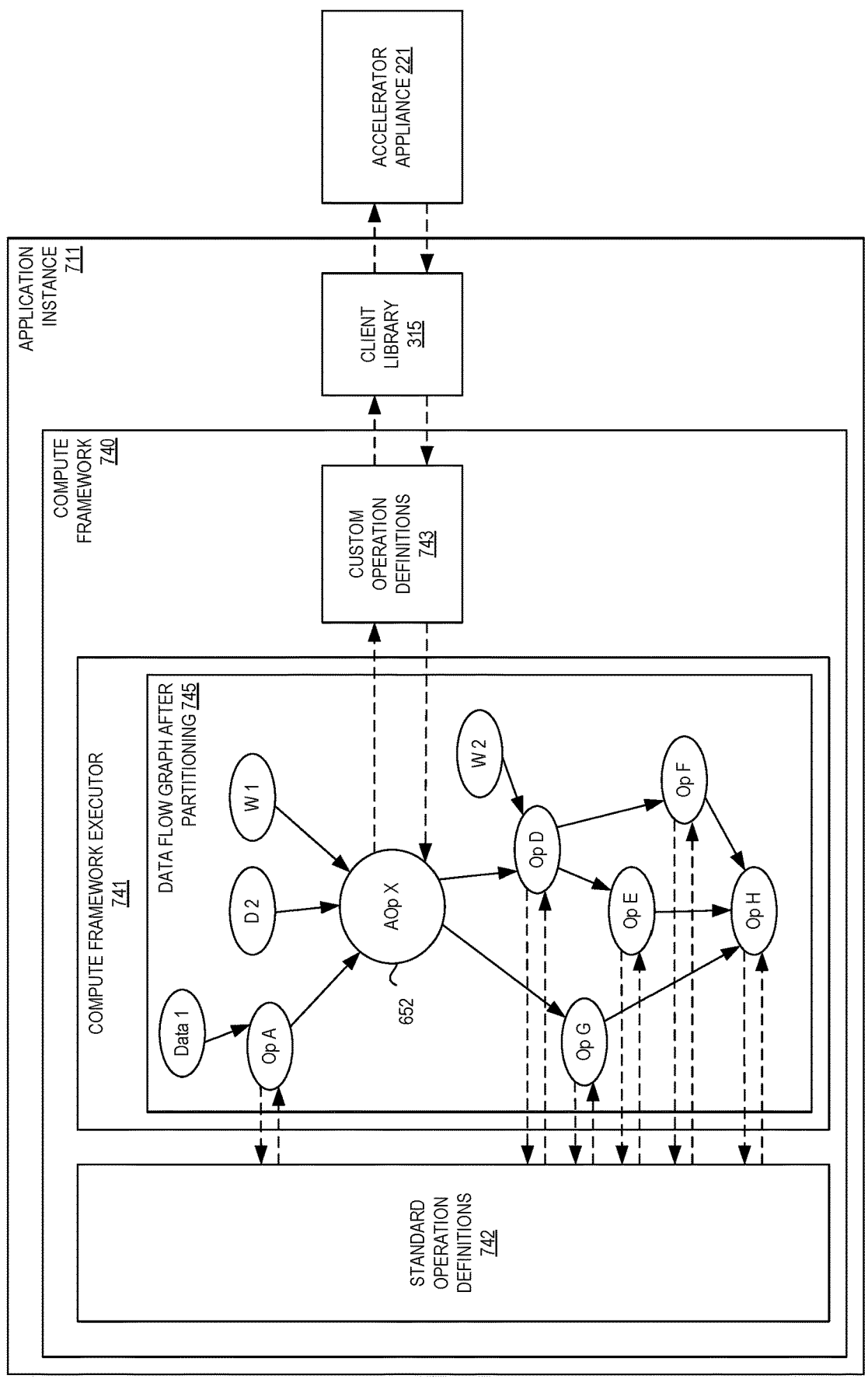
FIG. 7 illustrates embodiments of a computation framework that executes a data flow.

FIG. 7 illustrates embodiments of a computation framework that executes a data flow. As shown, an application instance 711 includes a client library 315 and a compute framework 740, such as the compute framework 540 described above. The compute framework 740 includes a compute framework executor 741, a set of standard operation definitions 742, and a set of custom operation definitions 743. The compute framework executor 741 takes as input a data flow graph and controls the overall flow of execution of the operations (e.g., storing results of an operation, calling a subsequent, dependent operation based on results of the previous operation, etc.). The standard operation definitions 742 include framework-supported operations that are executed by the application instance 711 rather than with an attached accelerator. The standard operation definitions 742 may be pre-loaded as part of the compute framework 740. To minimize or eliminate the need to make any modifications to the compute framework executor 741 while still facilitating the use of an attached accelerator, the set of custom operation definitions 743 may be used. In this manner, the compute framework 740 is "oblivious" to sending operations in a data flow outside of the execution environment of the application instance 711.

During execution of a data flow graph 745, the compute framework executor 741 issues calls to the set of standard operation definitions 742 for operations that are pre-loaded as part of the compute framework 740, such as is shown for operations A, D, G, E, F, and H. Upon encountering an operator that is not part of the standard operation definitions 742, the compute framework executor 741 makes a call to the custom operation definitions 743. Exemplary custom operations can include the "AOp" operations associated with operations B and C or the subgraph operation AOp X 653 that encapsulates operations B and C as shown in FIG. 6. While some custom operations in the set of custom operation definitions 743 may be user-configured and execute with the environment of the application instance 711, a custom accelerator-supported operation makes calls to the client library 315 which in turns communicates the supported operations (and associated data inputs to and output from) the accelerator appliance 221.

Figure 8:
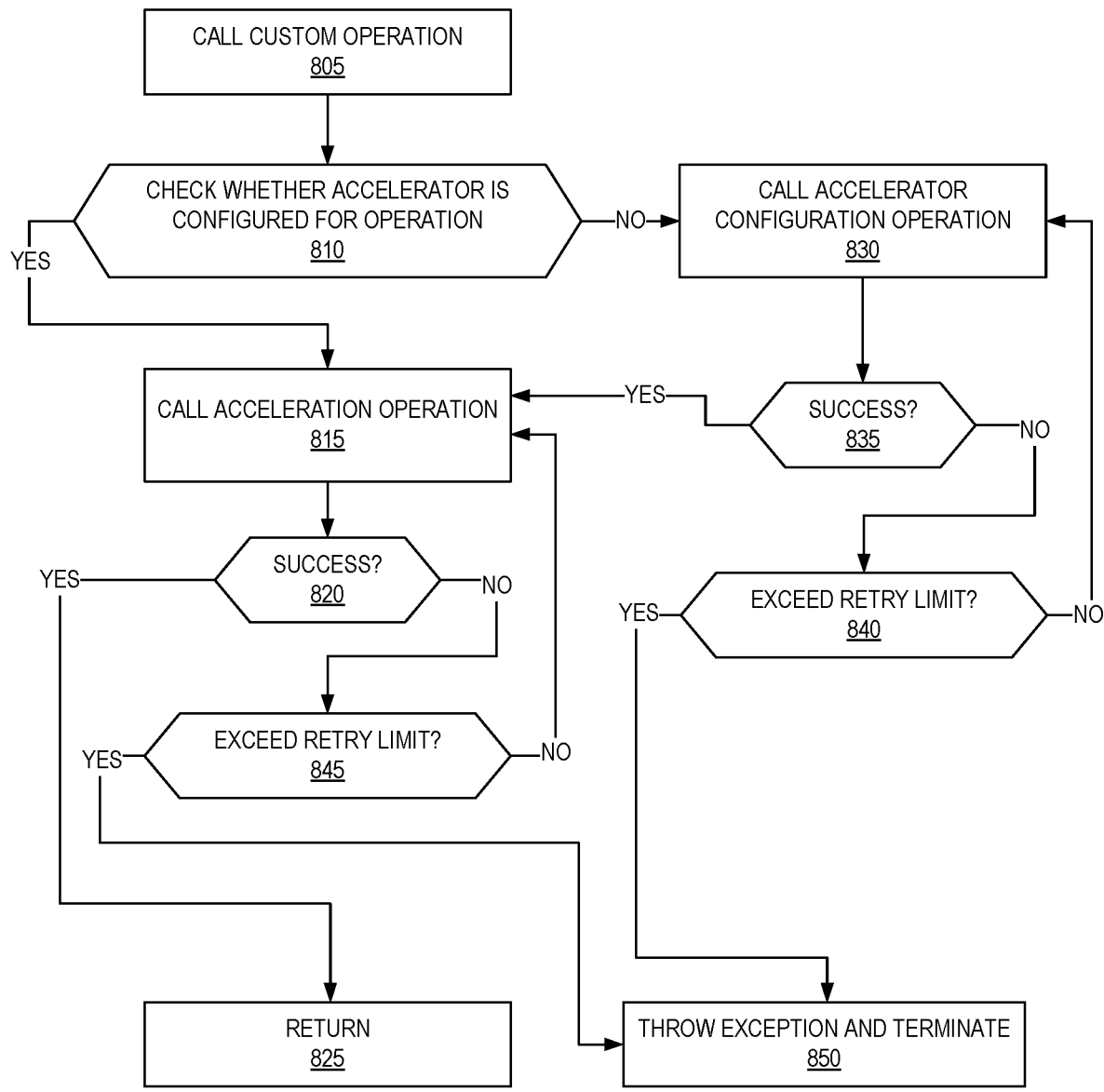
FIG. 8 illustrates embodiments of a method performed by a custom operation of a compute framework.

FIG. 8 illustrates embodiments of a method of a custom operation of a compute framework. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of FIG. 8 are performed by the compute framework of the other figures.

The operations include, at block 805, calling a custom operation. For example, as explained above, the compute framework 740 can call a custom operation definition specified in the custom operation definitions 743 for accelerator-supported operations as identified by the graph partitioner 550.

The operations include, at block 810, checking whether the attached accelerator is configured to perform the operation. For example, a custom operation for inference operations may make a listModels call to the client library 315, as described above. If the accelerator is configured to perform the operation, operations continue to block 815. Otherwise, operations continue to block 830, described below.

The operations include, at block 815, calling the acceleration operation. For example, a custom operation for an inference operation may make a predict call to the client library 315, as described above.

The operations include, at block 820, determining whether the acceleration operation succeeded. For example, if the acceleration operation is expected to return, the custom operation may have a timeout period that, when lapsed, causes the custom operation can proceed to block 845. As another example, the client library may include an API call that allows the calling process to check the state of a previously submitted operation. If, upon checking, the state indicates the previously pending operation failed, the custom operation can proceed to block 845. If the operation was successful, operations can continue to block 825. In some embodiments, the custom operation can make a getResults call to the client library 315, as described above, to retrieve the results of a previously issued acceleration operation.

The operations include, at block 825, returning to the process which called the custom operation. For example, execution of the data flow may involve the compute framework 740 calling a custom operation which later returns so that the data flow operations may proceed.

The operations include, at block 830, calling the accelerator configuration operation. For example, a custom operation for an inference operation may make a loadmodel call to the client library 315, as described above.

The operations include, at block 835, determining whether the accelerator configuration operation succeeded. For example, if the accelerator configuration operation is expected to return, the custom operation may have a timeout period that, when lapsed, causes the custom operation can proceed to block 840. As another example, the custom operation my make a listModels call after some period of time to check whether the accelerator has been configured. If, upon checking, the state indicates the previously pending operation failed, the custom operation can proceed to block 840. If the operation was successful, operations can continue to block 815.

The operations include, at blocks 840 and 845, determining whether a retry limit has been exceeded for the configuration operation and the acceleration operation, respectively. If so, the custom operation can proceed to block 850. Otherwise, the operations can return to the respective acceleration or configuration operation at blocks 830 and 815, as described above.

The operations include, at block 850, throwing an exception and terminating the operation. If, for some reason, the custom operation is unable to be performed (e.g., loss of communication with an attached accelerator), the custom operation throws an exception so that the error handling of the compute framework or application instance can, for example, notify the user of the error, attempt to re-establish the connection to the accelerator, etc.

Figure 9:
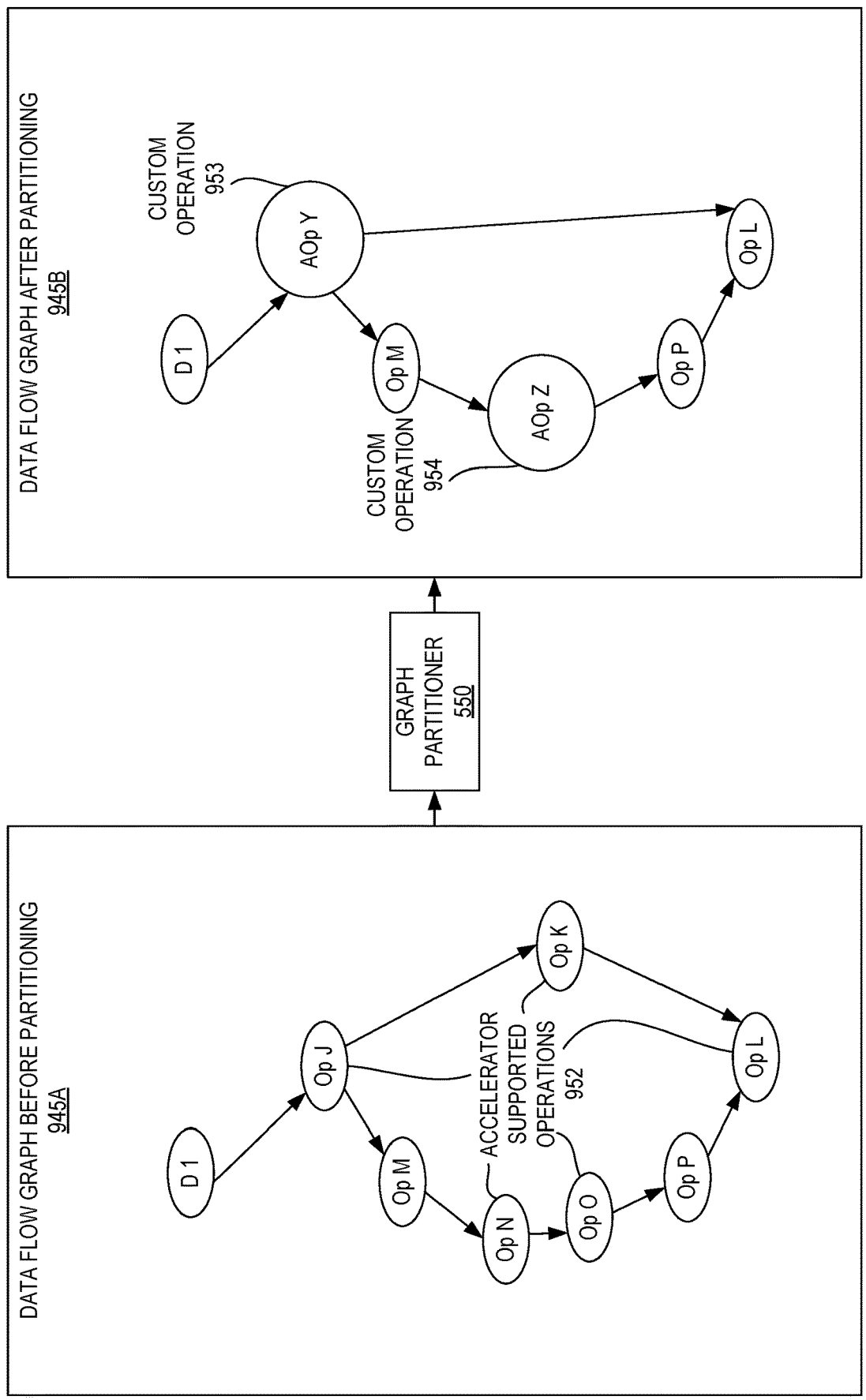
FIG. 9 illustrates embodiments of another exemplary data flow partitioning.

FIG. 9 illustrates embodiments of another exemplary data flow partitioning. On the left side of FIG. 9 is an exemplary data flow graph 945A before partitioning, and on the right side of FIG. 9 is an exemplary data flow graph 945B after partitioning. As in FIG. 6, circles, or nodes, operations or input data to operations and edges represent data flow into and out of operations. In this example, operation ("Op") J depends on "D 1." Operations K and M depend on an output of operation J. Operation N depends on an output of operation M, operation O depends on an output of operation N, operation P depends on an output of operation O, and operation L depends on an output of operations P and K. In this example, operations J, K, L, N, and O are accelerator supported operations 952.

The graph partitioner 550 takes as input the data flow graph 945A and modifies it or creates a new data flow graph. For example, the graph partitioner 550 may output a new data flow graph or modify the existing data flow graph. The data flow graph 945B identifies accelerator-compatible operations to the compute framework (not shown). In generating data flow graph 945B, the graph partitioner 550 relies on the set of accelerator-supported operations, described above.

As shown in this example, the graph partitioner 550 coalesces operations N and O as a custom operation 954 ("AOp Z") and operations J and K as a custom operation 953 ("AOp Y"). In this example, the graph partitioner 550 avoids coalescing operations J, K, and L despite their position in the graph as three-consecutive accelerator supported operations to avoid introducing a cycle into the graph. A cycle occurs when a node is both a dependent and a dependency of another node in the graph and introduces problems scheduling operations during execution. For example, if operations J, K, and L were coalesced into a single custom operation, the branch including operations M and P would both depend on the coalesced node (as indicated by the dependency of operation M on operation J) and a dependency of the coalesced node (as indicated by the dependency of operation L on operation P). Note that while the graph partitioner 550 coalesced operations J and K in this example (trimming operation L from the coalesced node), operations K and L could have been coalesced (trimming operation J from the coalesced node).

Figure 10:
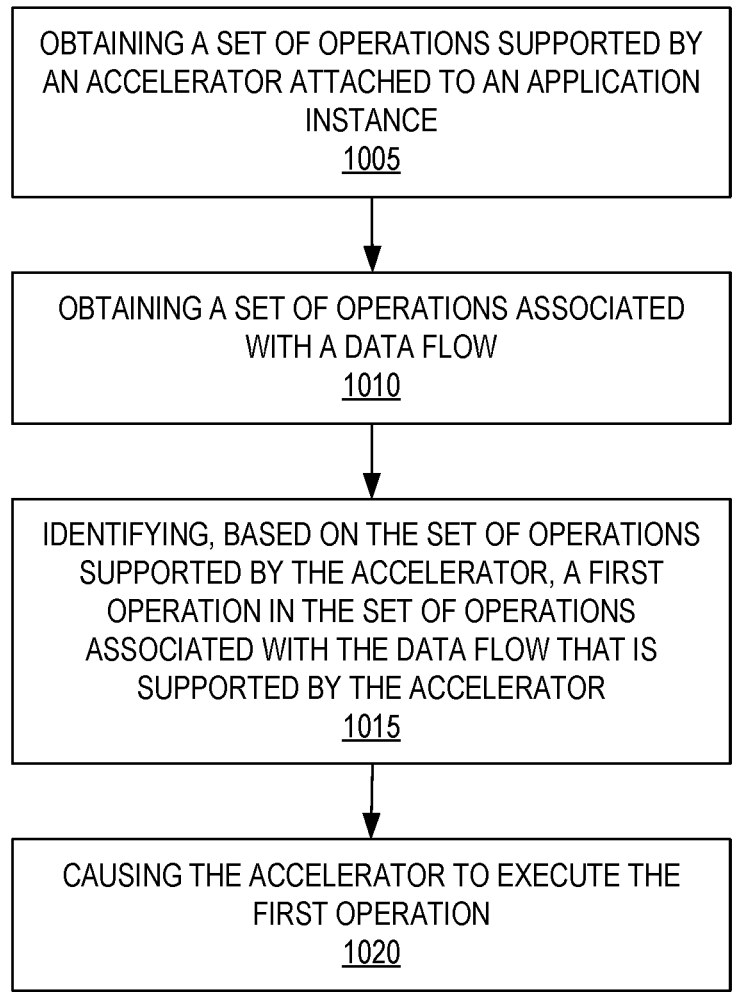
FIG. 10 illustrates embodiments of a method performed by a web services provider in implementing an elastic inference service.

FIG. 10 illustrates embodiments of a method performed by a web services provider in implementing an elastic inference service. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of FIG. 10 are performed by the web services provider of the other figures.

The operations include, at block 1005, obtaining a set of operations supported by an accelerator attached to an application instance. As detailed herein, an application or program such as the graph partitioner 550 can obtain a set of accelerator-supported operations from the accelerator itself or from a metadata store such as IMDS 371.

The operations include, at block 1010, obtaining a set of operations associated with a data flow. As detailed herein, the graph partitioner 550 can also obtain a data flow that includes a set of operations, some of which may be supported by an accelerator attached to an application instance.

The operations include, at block 1015, identifying, based on the set of operations supported by the accelerator, a first operation in the set of operations associated with the data flow that is supported by the accelerator. As detailed herein, the graph partitioner 550 can modify the data flow or create a new data flow that tags or substitute operations in the data flow such that the application instance will submit a accelerator-supported operation to the attached accelerator.

The operations include, at block 1020, causing the accelerator to execute the first operation. As detailed herein, a compute framework, upon executing a data flow and encountering an accelerator supported operation, can issue a call via a client library 351 to submit the operation to the attached accelerator. In some embodiments, the compute framework is oblivious to the accelerator-based execution of the operation by leveraging custom operations within the compute framework.

Although described with reference to machine learning applications and inference accelerators, attached accelerators may be used for other forms of numerical computation in which the computations or applications are developed using a data flow model.

Figure 11:
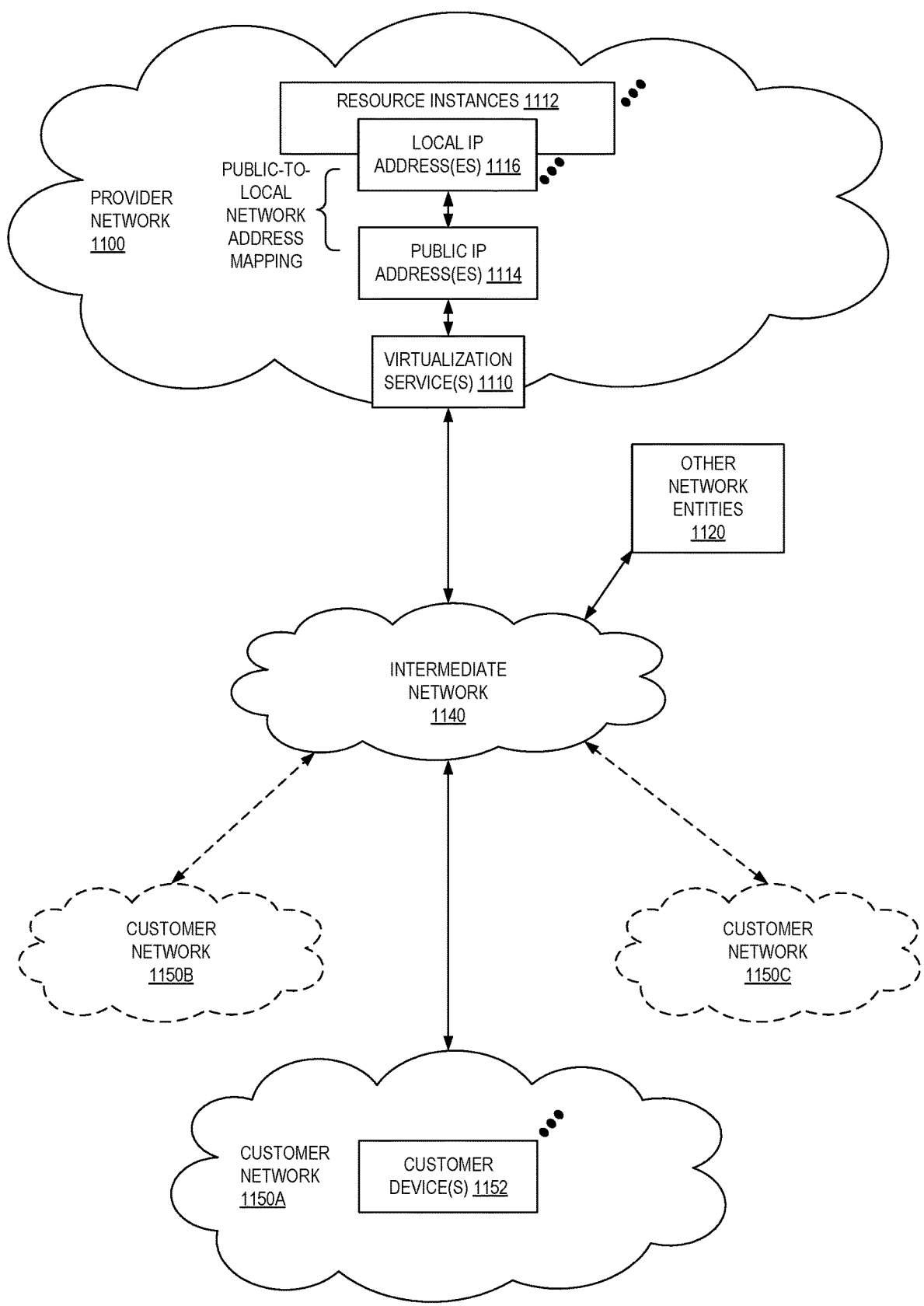
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
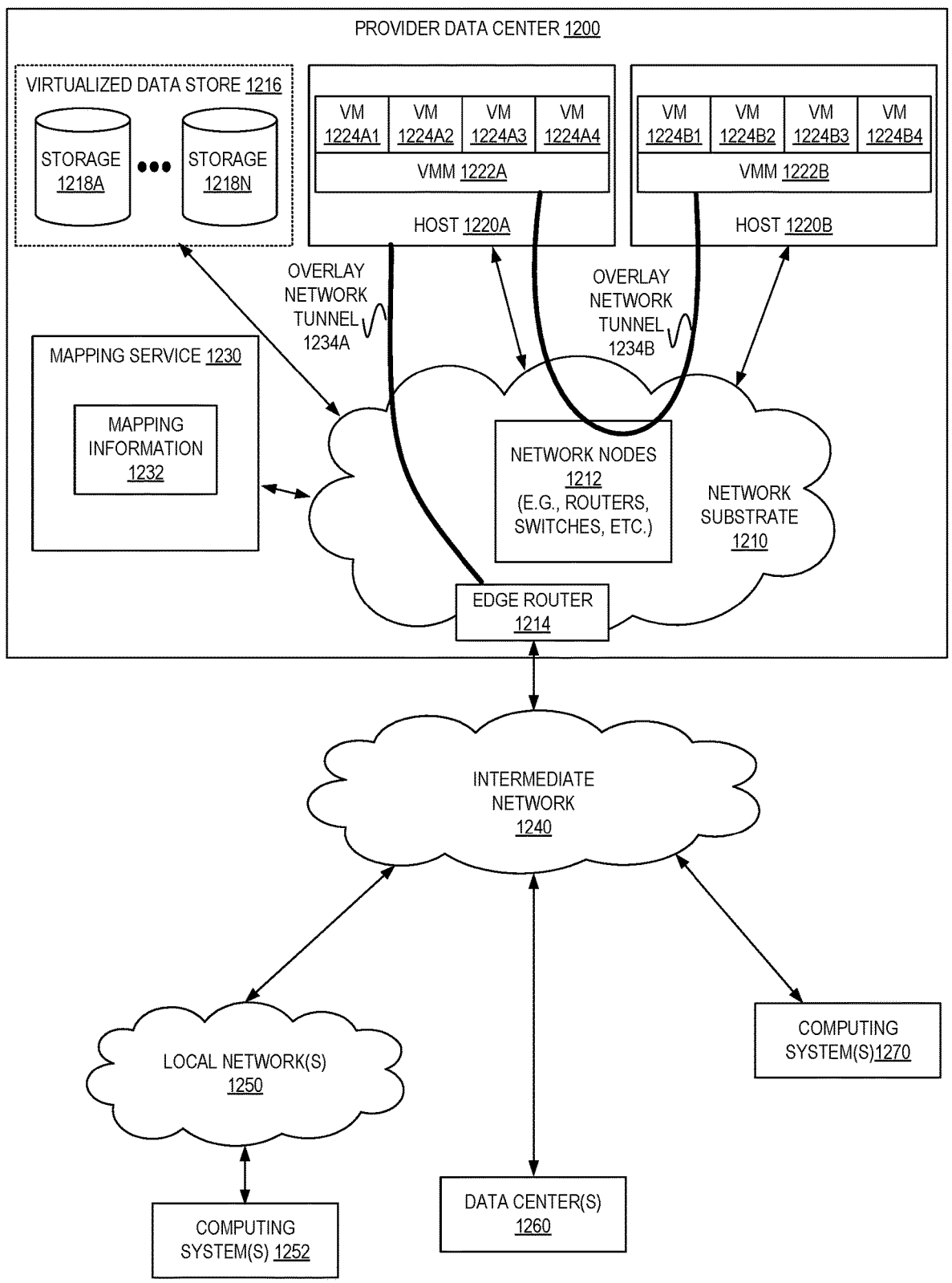
FIG. 12 illustrates an example data center that implements an overlay network on a network substrate using IP tunneling technology according to some embodiments.

FIG. 12 illustrates an example data center that implements an overlay network on a network substrate using IP tunneling technology, according to some embodiments. A provider data center 1200 may include a network substrate that includes networking nodes 1212 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1210 using tunnels. The IP tunneling technology may provide a mapping and encapsulating system for creating an overlay network on a network (e.g., a local network in data center 1200 of FIG. 12) and may provide a separate namespace for the overlay layer (the public IP addresses) and the network substrate 1210 layer (the local IP addresses). Packets in the overlay layer may be checked against a mapping directory (e.g., provided by mapping service 1230) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1230) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 12, an example overlay network tunnel 1234A from a virtual machine (VM) 1224A (of VMs 1224A1-1224A4, via VMM 1222A) on host 1220A to a device on the intermediate network 1250 and an example overlay network tunnel 1234B between a VM 1224A (of VMs 1224A1-1224A4, via VMM 1222A) on host 1220A and a VM 1224B (of VMs 1224B1-1224B4, via VMM 1222B) on host 1220B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 12, at least some networks in which embodiments may be implemented may include hardware virtualization technology that enables multiple operating systems to run concurrently on a host computer (e.g., hosts 1220A and 1220B of FIG. 12), i.e. as virtual machines (VMs) 1224 on the hosts 1220. The VMs 1224 may, for example, be executed in slots on the hosts 1220 that are rented or leased to customers of a network provider. A hypervisor, or virtual machine monitor (VMM) 1222, on a host 1220 presents the VMs 1224 on the host with a virtual platform and monitors the execution of the VMs 1224. Each VM 1224 may be provided with one or more local IP addresses; the VMM 1222 on a host 1220 may be aware of the local IP addresses of the VMs 1224 on the host. A mapping service 1230 may be aware of (e.g., via stored mapping information 1232) network IP prefixes and IP addresses of routers or other devices serving IP addresses on the local network. This includes the IP addresses of the VMMs 1222 serving multiple VMs 1224. The mapping service 1230 may be centralized, for example on a server system, or alternatively may be distributed among two or more server systems or other devices on the network. A network may, for example, use the mapping service technology and IP tunneling technology to, for example, route data packets between VMs 1224 on different hosts 1220 within the data center 1200 network; note that an interior gateway protocol (IGP) may be used to exchange routing information within such a local network.

In addition, a network such as the provider data center 1200 network (which is sometimes referred to as an autonomous system (AS)) may use the mapping service technology, IP tunneling technology, and routing service technology to route packets from the VMs 1224 to Internet destinations, and from Internet sources to the VMs 1224. Note that an external gateway protocol (EGP) or border gateway protocol (BGP) is typically used for Internet routing between sources and destinations on the Internet. FIG. 12 shows an example provider data center 1200 implementing a network that provides resource virtualization technology and that provides full Internet access via edge router(s) 1214 that connect to Internet transit providers, according to some embodiments. The provider data center 1200 may, for example, provide customers the ability to implement virtual computing systems (VMs 1224) via a hardware virtualization service and the ability to implement virtualized data stores 1216 on storage resources 1218A-1218N via a storage service.

The data center 1200 network may implement IP tunneling technology, mapping service technology, and a routing service technology to route traffic to and from virtualized resources, for example to route packets from the VMs 1224 on hosts 1220 in data center 1200 to Internet destinations, and from Internet sources to the VMs 1224. Internet sources and destinations may, for example, include computing systems 1270 connected to the intermediate network 1240 and computing systems 1252 connected to local networks 1250 that connect to the intermediate network 1240 (e.g., via edge router(s) 1214 that connect the network 1250 to Internet transit providers). The provider data center 1200 network may also route packets between resources in data center 1200, for example from a VM 1224 on a host 1220 in data center 1200 to other VMs 1224 on the same host or on other hosts 1220 in data center 1200.

A service provider that provides data center 1200 may also provide additional data center(s) 1260 that include hardware virtualization technology similar to data center 1200 and that may also be connected to intermediate network 1240. Packets may be forwarded from data center 1200 to other data centers 1260, for example from a VM 1224 on a host 1220 in data center 1200 to another VM on another host in another, similar data center 1260, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1218A-1218N, as virtualized resources to customers of a network provider in a similar manner.

Figure 13:
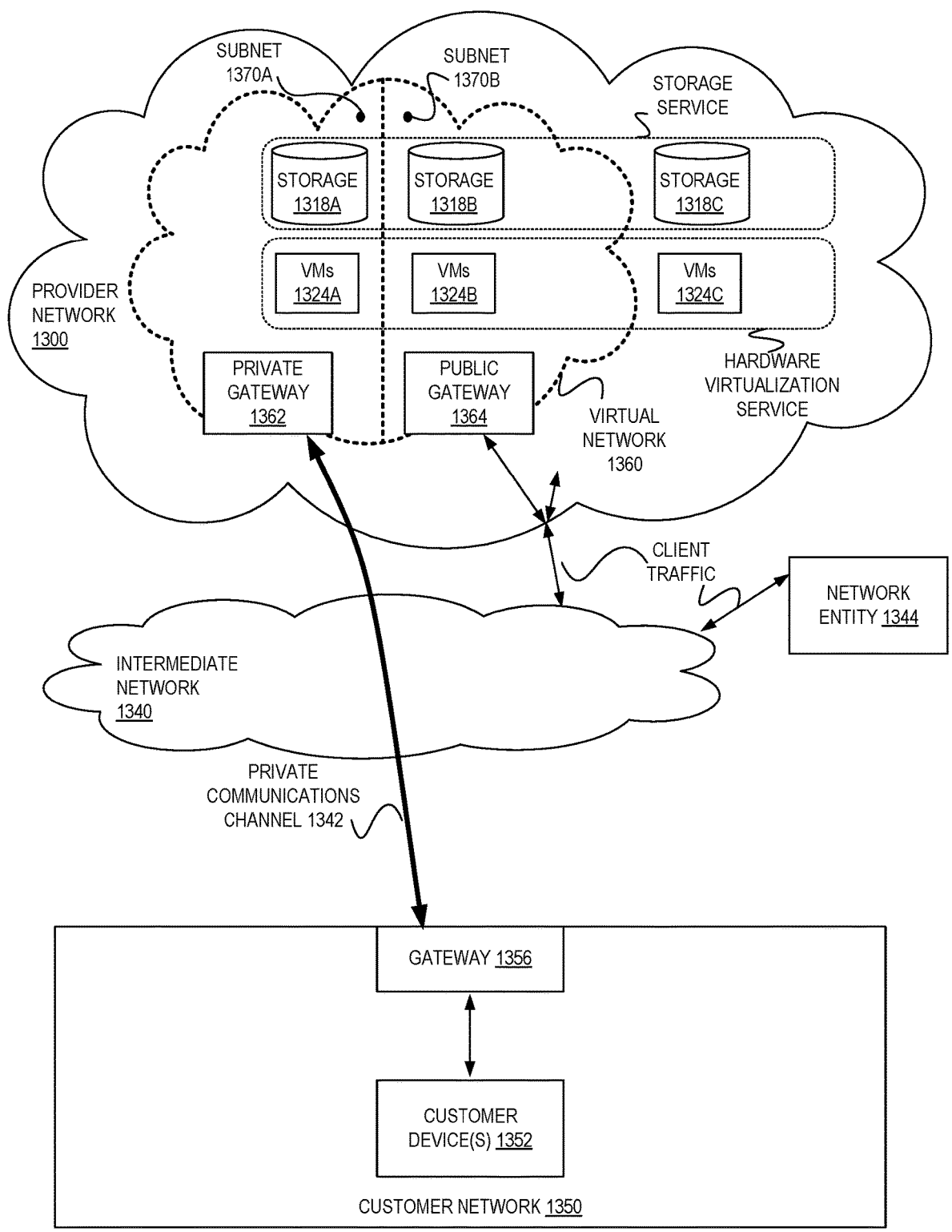
FIG. 13 illustrates an example provider network that provides virtual networks on the provider network to at least some customers according to some embodiments.

FIG. 13 illustrates an example provider network that provides virtual networks on the provider network to at least some customers, according to some embodiments. A customer's virtual network 1360 on a provider network 1300, for example, enables a customer to connect their existing infrastructure (e.g., one or more customer devices 1352) on customer network 1350 to a set of logically isolated resource instances (e.g., VMs 1324A and 1324B and storage 1318A and 1318B), and to extend management capabilities such as security services, firewalls, and intrusion detection systems to include their resource instances.

A customer's virtual network 1360 may be connected to a customer network 1350 via a private communications channel 1342. A private communications channel 1342 may, for example, be a tunnel implemented according to a network tunneling technology or some other technology over an intermediate network 1340. The intermediate network may, for example, be a shared network or a public network such as the Internet. Alternatively, a private communications channel 1342 may be implemented over a direct, dedicated connection between virtual network 1360 and customer network 1350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1360 for a customer on provider network 1300, one or more resource instances (e.g., VMs 1324A and 1324B and storage 1318A and 1318B) may be allocated to the virtual network 1360. Note that other resource instances (e.g., storage 1318C and VMs 1324C) may remain available on the provider network 1300 for other customer usage. A range of public IP addresses may also be allocated to the virtual network 1360. In addition, one or more networking nodes (e.g., routers, switches, etc.) of the provider network 1300 may be allocated to the virtual network 1360. A private communications channel 1342 may be established between a private gateway 1362 at virtual network 1360 and a gateway 1356 at customer network 1350.

In some embodiments, in addition to, or instead of, a private gateway 1362, virtual network 1360 may include a public gateway 1364 that enables resources within virtual network 1360 to communicate directly with entities (e.g., network entity 1344) via intermediate network 1340, and vice versa, instead of or in addition to via private communications channel 1342.

Virtual network 1360 may be, but is not necessarily, subdivided into two or more subnetworks, or subnets, 1370. For example, in implementations that include both a private gateway 1362 and a public gateway 1364, a virtual network 1360 may be subdivided into a subnet 1370A that includes resources (VMs 1324A and storage 1318A, in this example) reachable through private gateway 1362, and a subnet 1370B that includes resources (VMs 1324B and storage 1318B, in this example) reachable through public gateway 1364.

The customer may assign particular customer public IP addresses to particular resource instances in virtual network 1360. A network entity 1344 on intermediate network 1340 may then send traffic to a public IP address published by the customer; the traffic is routed, by the provider network 1300, to the associated resource instance. Return traffic from the resource instance is routed, by the provider network 1300, back to the network entity 1344 over intermediate network 1340. Note that routing traffic between a resource instance and a network entity 1344 may require network address translation to translate between the public IP address and the local IP address of the resource instance.

Some embodiments may allow a customer to remap public IP addresses in a customer's virtual network 1360 as illustrated in FIG. 13 to devices on the customer's external network 1350. When a packet is received (e.g., from network entity 1344), the network 1300 may determine that the destination IP address indicated by the packet has been remapped to an endpoint on external network 1350 and handle routing of the packet to the respective endpoint, either via private communications channel 1342 or via the intermediate network 1340. Response traffic may be routed from the endpoint to the network entity 1344 through the provider network 1300, or alternatively may be directly routed to the network entity 1344 by the customer network 1350. From the perspective of the network entity 1344, it appears as if the network entity 1344 is communicating with the public IP address of the customer on the provider network 1300. However, the network entity 1344 has actually communicated with the endpoint on customer network 1350.

While FIG. 13 shows network entity 1344 on intermediate network 1340 and external to provider network 1300, a network entity may be an entity on provider network 1300. For example, one of the resource instances provided by provider network 1300 may be a network entity that sends traffic to a public IP address published by the customer.

Figure 14:
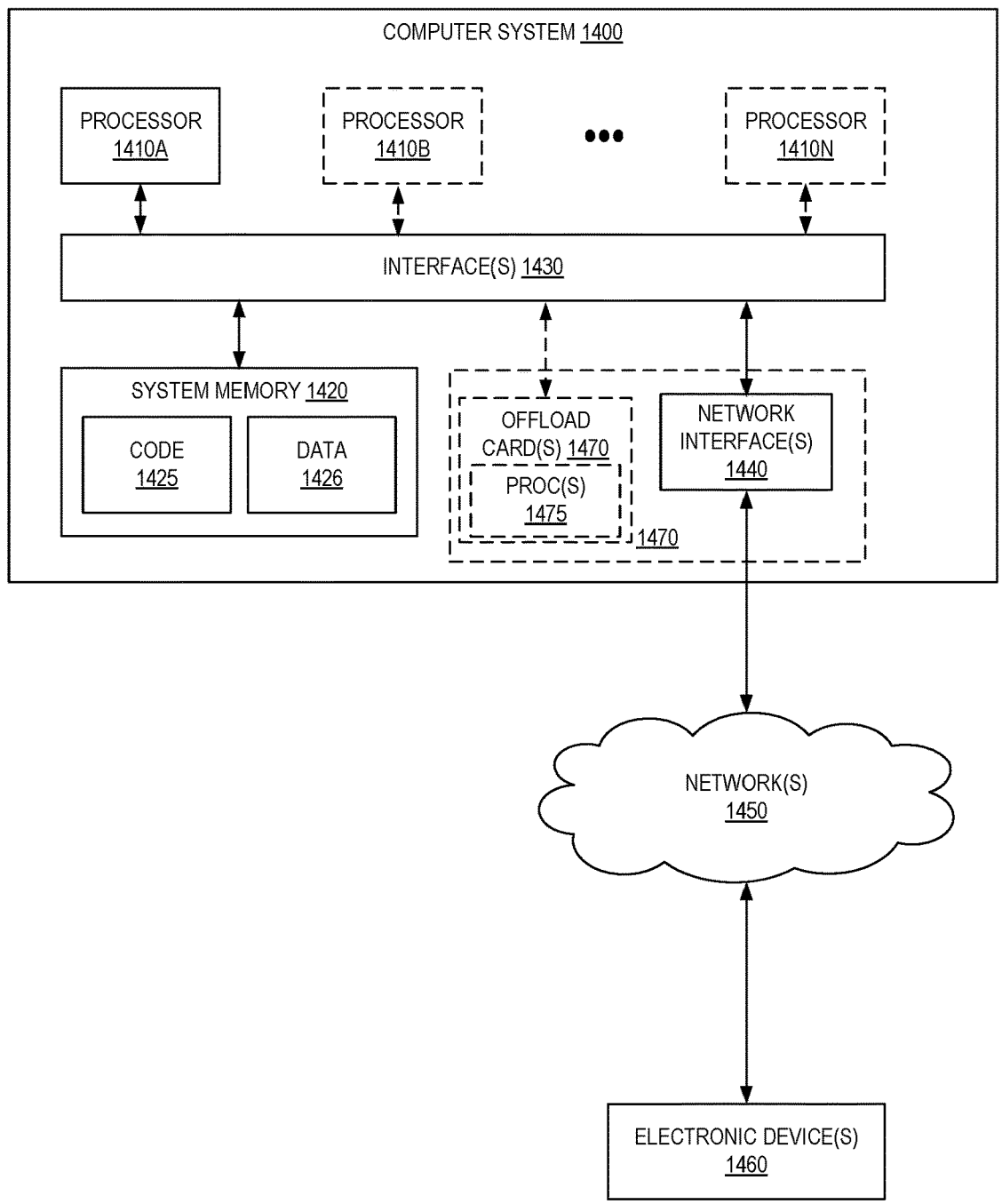
FIG. 14 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
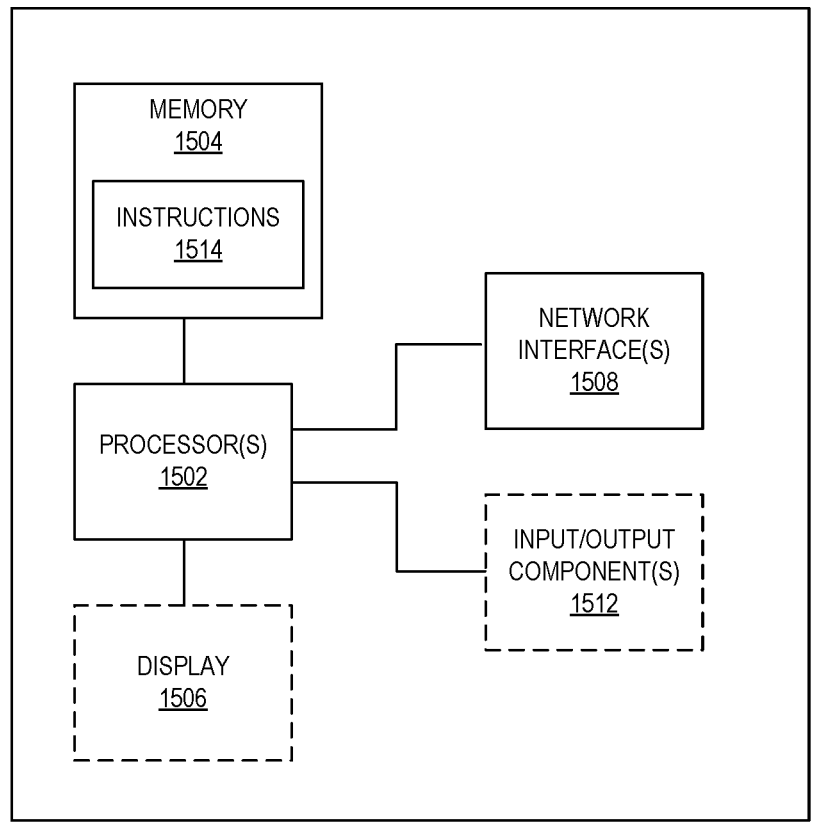
FIG. 15 illustrates a logical arrangement of a set of general components of an exemplary computing device that can be utilized in accordance with various embodiments.

FIG. 15 illustrates a logical arrangement of a set of general components of an example computing device 1500 such as a web services provider, etc. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (e.g., instructions 1514) and/or data, and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1514) for execution on the set of one or more processors 1502 of that electronic device. One or more parts of various embodiments may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some embodiments include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 16:
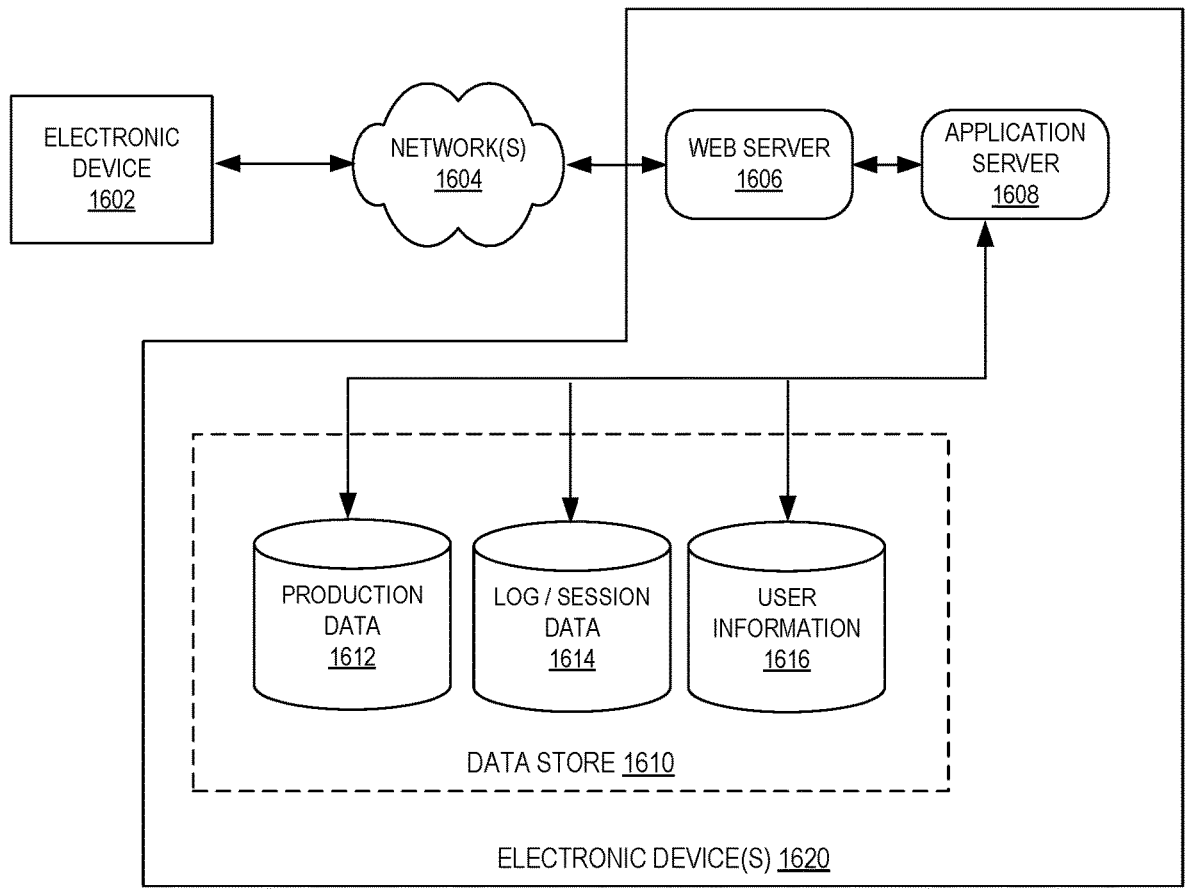
FIG. 16 illustrates an example of an environment for implementing aspects in accordance with various embodiments.

As discussed, different approaches can be implemented in various environments in accordance with the described embodiments. For example, FIG. 16 illustrates an example of an environment 1600 for implementing aspects in accordance with various embodiments. For example, in some embodiments requests are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various embodiments. The system includes an electronic client device 1602, which may also be referred to as a client device and can be any appropriate device operable to send and receive requests, messages or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining, by an application instance from an accelerator attached to the application instance via a communication channel between the application instance and the accelerator, a list of accelerator-supported operations;
   obtaining a set of operations associated with a data flow, the data flow represented as a graph having nodes corresponding to operations from the set of operations and edges corresponding to data input to and output from the operations;
   evaluating the graph based on the list obtained from the accelerator to identify a plurality of consecutive operations in the set of operations that are supported by the accelerator and a first operation in the set of operations that is not supported by the accelerator;
   executing, by the application instance, the first operation; and
   causing the accelerator to execute the plurality of consecutive operations by:
      issuing an application programming interface call associated with the plurality of consecutive operations;
      sending input data to the plurality of consecutive operations to the accelerator; and
      retrieving output data from the plurality of consecutive operations from the accelerator.

2. The computer-implemented method of claim 1, further comprising combining the plurality of consecutive operations into a single custom operation defined within a compute framework of the application instance.

3. The computer-implemented method of claim 1, further comprising:
   identifying, based on the list, a second operation in the set of operations that is supported by the accelerator;
   determining that a latency associated with an execution of the second operation by the accelerator would exceed a latency associated with an execution of the second operation by the application instance; and
   executing, by the application instance, the second operation.

4. A computer-implemented method comprising:
   obtaining, from an accelerator attached to an application instance via a communication channel between the accelerator and the application instance, a set of operations supported by the accelerator;
   obtaining a set of operations associated with a data flow, the data flow represented as a graph having nodes corresponding to operations from the set of operations and edges corresponding to data input to and output from the operations;
   evaluating the graph, based on the set of operations supported by the accelerator and obtained from the accelerator, to identify at least a first operation in the set of operations associated with the data flow that is supported by the accelerator; and
   causing the accelerator to execute the first operation by:
      issuing an application programming interface call associated with the first operation;
      sending input data to the first operation to the accelerator; and
      receiving output data from the first operation from the accelerator.

5. The computer-implemented method of claim 4, further comprising:
   identifying, based on the set of operations supported by the accelerator, a second operation in the set of operations associated with the data flow that is supported by the accelerator and is contiguous with the first operation; and
   combining the first operation and the second operation into a single custom operation defined within a compute framework of the application instance.

6. The computer-implemented method of claim 5, wherein the single custom operation issues a call to a library of the application instance that interfaces the compute framework to the accelerator.

7. The computer-implemented method of claim 4, further comprising:
   identifying, based on the set of operations supported by the accelerator, a second operation in the set of operations associated with the data flow that is not supported by the accelerator; and
   executing, by the application instance, the second operation.

8. The computer-implemented method of claim 4, wherein
   identifying, based on the set of operations supported by the accelerator, a second operation in the set of operations associated with the data flow that is supported by the accelerator;
   determining that a latency associated with an execution of the second operation by the accelerator would exceed a latency associated with an execution of the second operation by the application instance; and
   executing, by the application instance, the second operation.

9. The computer-implemented method of claim 8, wherein the executing the second operation by the application instance is performed by a compute framework.

10. The computer-implemented method of claim 8, wherein the latency is based on a data throughput rate of the communication channel between the application instance and the accelerator.

11. The computer-implemented method of claim 10, wherein the latency is further based on a performance of the accelerator.

12. The computer-implemented method of claim 4, wherein the identifying the first operation in the set of operations associated with the data flow that is supported by the accelerator is performed by a service of a web services provider.

13. The computer-implemented method of claim 4, wherein the first operation is part of a loop, wherein execution of the loop is performed by the accelerator.

14. A system comprising:
a storage device to store a data flow application comprising a set of operations; and
a first one or more electronic devices, including a processor and memory, implementing an application instance, the application instance including instructions that upon execution cause the application instance to:
obtain, from an accelerator attached to the application instance via a communication channel between the accelerator and the application instance, a set of operations supported by the accelerator;
obtain the data flow application from the storage device, the data flow application represented as a graph having nodes corresponding to operations from the set of operations and edges corresponding to data input to and output from the operations;
evaluate the graph, based on the set of operations supported by the accelerator and obtained from the accelerator, to identify at least a first operation in the data flow application that is supported by the accelerator; and
cause the accelerator to execute the first operation by:
issuing an application programming interface call associated with the first operation;
sending input data to the first operation to the accelerator; and
receiving output data from the first operation from the accelerator.

15. The system of claim 14, wherein the instructions, upon execution, further cause the application instance to:
identify, based on the set of operations supported by the accelerator, a second operation in the data flow application that is supported by the accelerator and is contiguous with the first operation; and
combine the first operation and the second operation into a single custom operation defined within a compute framework of the application instance.

16. The system of claim 15, wherein the single custom operation issues a call to a library of the application instance that interfaces the compute framework to the accelerator.

17. The system of claim 14, wherein the instructions, upon execution, further cause the application instance to:
identify, based on the set of operations supported by the accelerator, a second operation in the data flow application that is not supported by the accelerator; and
execute the second operation.

18. The system of claim 14, wherein the instructions, upon execution, further cause the application instance to:
identify, based on the set of operations supported by the accelerator, a second operation in the data flow application that is supported by the accelerator;
determine that a latency associated with an execution of the second operation by the accelerator would exceed a latency associated with an execution of the second operation by the application instance; and
execute the second operation.

19. The system of claim 18, wherein the latency is based on a data throughput rate of the communication channel between the application instance and the accelerator.

20. The system of claim 19, wherein the latency is further based on a performance of the accelerator.

* * * * *